US006829058B1

(12) United States Patent
Kumada

(10) Patent No.: US 6,829,058 B1
(45) Date of Patent: *Dec. 7, 2004

(54) COLOR MATCHING, AND CALIBRATING A COLOR-MATCHING PROFILE, PREFERABLY USING A CLIENT-SERVER ARCHITECTURE

(75) Inventor: Shuichi Kumada, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,317

(22) Filed: Jan. 29, 1998

(30) Foreign Application Priority Data

Jan. 31, 1997 (JP) .............................................. 9-018776
Jan. 16, 1998 (JP) ............................................ 10-006533

(51) Int. Cl.[7] .............................................. G06F 15/00
(52) U.S. Cl. ....................... 358/1.15; 358/518; 358/1.9; 382/167
(58) Field of Search ................................. 395/109, 114, 395/115; 358/521, 1.1–1.9, 1.11–1.18, 518, 527; 715/528; 345/22, 543, 549, 593; 382/167

(56) References Cited

U.S. PATENT DOCUMENTS

| 5,394,523 A | * | 2/1995 | Harris ........................ 345/501 |
|---|---|---|---|
| 5,416,890 A | * | 5/1995 | Beretta ........................ 395/131 |
| 5,544,302 A | * | 8/1996 | Nguyen ....................... 345/326 |
| 5,579,090 A | * | 11/1996 | Sasanuma et al. ............. 399/49 |
| 5,699,489 A | * | 12/1997 | Yokomizo .................... 395/109 |
| 5,806,081 A | * | 9/1998 | Swen et al. .................. 707/528 |
| 5,812,865 A | * | 9/1998 | Theimer et al. ............. 709/228 |
| 5,867,633 A | * | 2/1999 | Taylor, III et al. ........... 395/114 |
| 5,872,569 A | * | 2/1999 | Salgado et al. .............. 345/349 |
| 5,872,895 A | * | 2/1999 | Zandee et al. ................ 358/1.9 |
| 6,037,950 A | * | 3/2000 | Meir et al. ................... 345/431 |
| 6,075,888 A | * | 6/2000 | Schwartz ..................... 382/167 |
| 6,088,038 A | * | 7/2000 | Edge et al. .................. 345/431 |
| 6,134,029 A | * | 10/2000 | Granger ....................... 358/504 |

* cited by examiner

Primary Examiner—King Y. Poon
(74) Attorney, Agent, or Firm—Fitzpatrick, Cella, Harper & Scinto

(57) ABSTRACT

A network server for communicating with a network terminal through a network, comprising a reception unit for receiving, from the network terminal, selection information of a color management module and a device profile for performing a color matching process, a control unit for obtaining the color management module and the device profile, based on the selection information, a color matching unit for performing the color matching process on input data, by using the color management module and the device profile obtained by the control unit, and a communication unit for communicating the data subjected to the color matching process, to the network terminal.

7 Claims, 29 Drawing Sheets

FIG. 19

SCANNER DESIGNATION

● YES

| SCANNER LIST |
|---|
| → C COMPANY A-4015 |
| C COMPANY A-4025 |
| C COMPANY A-300 |
| C COMPANY A-600 |

[ SELECT ]

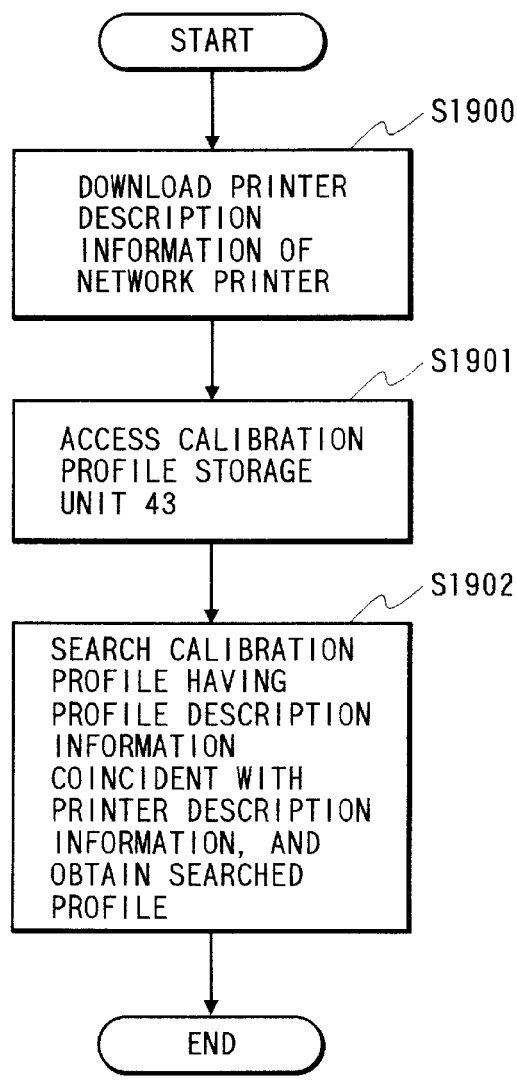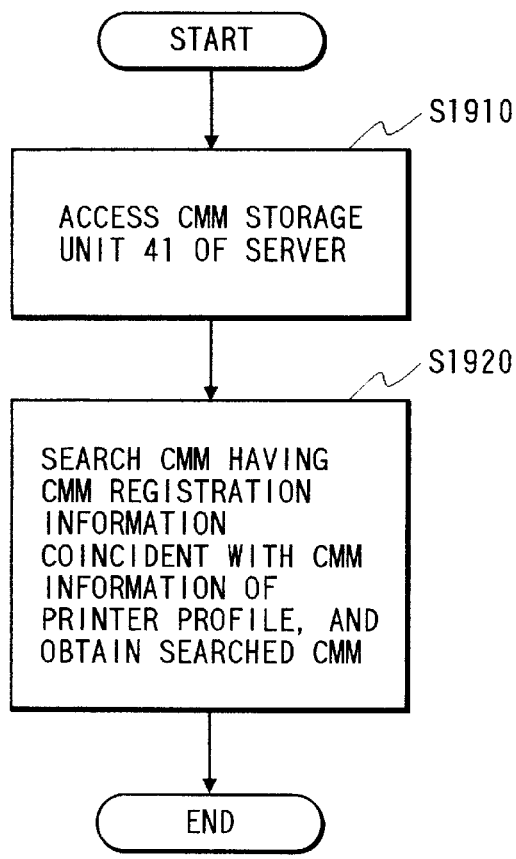

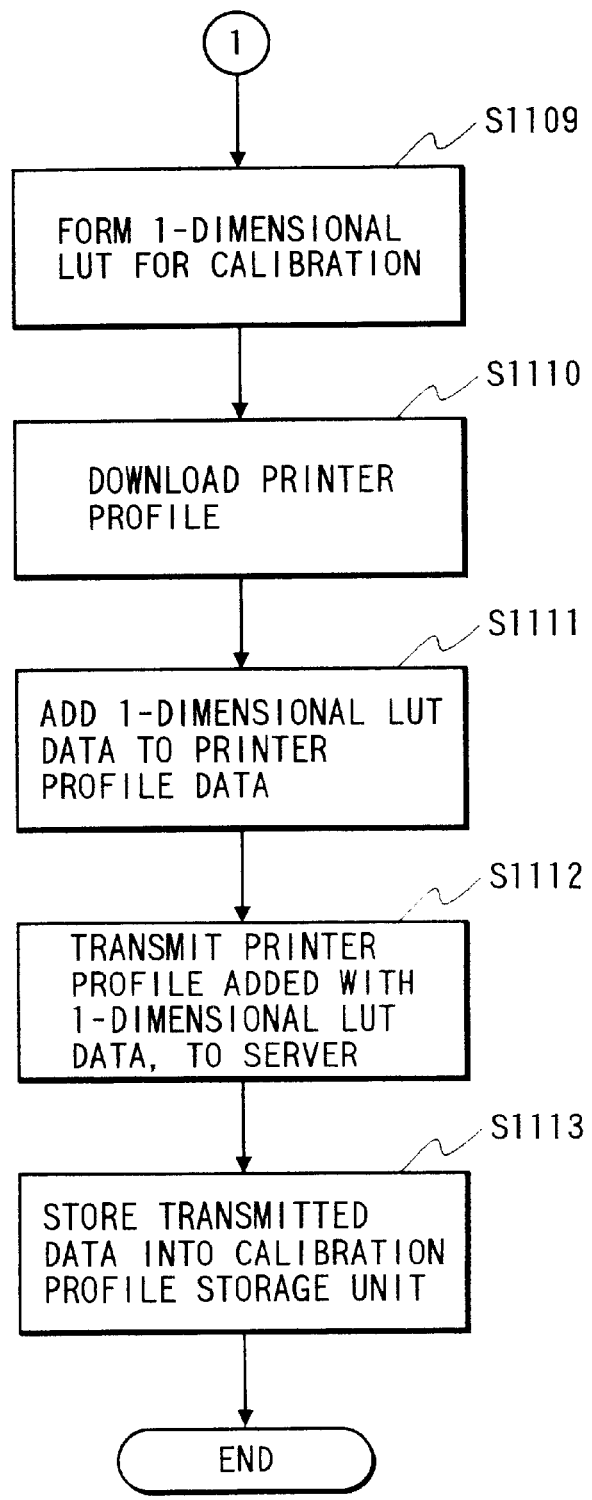

COLOR MATCHING, AND CALIBRATING A COLOR-MATCHING PROFILE, PREFERABLY USING A CLIENT-SERVER ARCHITECTURE

BACKGROUND OF THE INVENTION

1. Field of the Invention

The present invention relates to a network server which communicates with a network terminal through a network.

2. Related Background Art

As described in U.S. patent application Ser. No. 08/380,633 which was filed on Jan. 30, 1995 now abandoned and is based on Japanese Patent Application No. 6-9565 filed in Japan on Jan. 31, 1994, a color management system composed of a CMM (color management module) and a device profile performs a color conversion process to perform color matching between input and output images by using a profile corresponding to a source device before conversion and a profile corresponding to a destination device after conversion.

The former profile is called as a source profile, and the latter profile is called as a destination profile.

For example, in a color conversion process shown in FIG. 1, a scanner color space (i.e., scanner RGB) or a monitor color space (i.e., monitor RGB) is converted into a printer color space (i.e., printer CMYK).

In this case, since the source device is a scanner or a monitor, the profile of such the scanner or the monitor is handled as the source profile. On the other hand, since the destination device is a printer, the profile of such the printer is handled as the destination profile.

FIG. 2 is a view showing an example of the structure of the device profile.

The profile is divided into a header portion and a data storage portion. In the header portion, information which is used to manage the profile is stored. For example, as such the information, there are device information representing which device (e.g., monitor) the profile corresponds to, CMM information representing which CMM the profile is used for, and the like. On the other hand, in the data storage portion, profile description information for discriminating the profile is stored. As the profile description information, e.g., information representing a maker name and a product name is stored.

Conventionally, the above-described color management system has not been realized in a network system. That is, the device profile and the CMM which are used for the color conversion process could not been systematically handled between transmission and reception sides.

For this reason, there has been a drawback that it is difficult to realize the color matching between the transmission and reception sides.

SUMMARY OF THE INVENTION

The present invention was made in consideration of the above-described conventional drawback, and an object thereof is to realize color matching in a network system.

In order to achieve the above object, the present invention provides a network server for communicating with a network terminal through a network, comprising:

a means for receiving a CMM (color management module) used to perform the color matching process and selection information of a device profile from the network terminal;

a means for obtaining or fetching the CMM and the device profile based on the selection information;

a means for performing the color matching process on input data by using obtained the CMM and the device profile; and a means for communicating to the network terminal the color-matching-processed data.

An another object of the present invention is to provide an image process method which can calibrate the device profile such that a high-quality output image can be always obtained and is easy to be used.

In order to achieve the above object, the present invention provides the image process method having plural calibration methods, comprising:

selecting the arbitrary calibration method from among the plural calibration methods;

calibrating a device profile used for a color matching process, by using the selected calibration method; and storing the calibrated device profile.

The above and other objects, features, and advantages of the present invention will be apparent from the following detailed description and the appended claims in conjunction with the accompanying drawings.

BRIEF DESCRIPTION OF THE DRAWINGS

FIG. 19 is a view showing an example of a user interface;

FIG. 20 is a view showing an example of the user interface;

FIG. 34 is a flow chart showing a detailed process in a case where a printer profile in which calibration data of the network printer 50 has been stored is obtained by the network server 40;

FIG. 35 is a flow chart showing a detailed process in a case where a CMM (color management module) used for the color matching process is obtained by the network server 40;

FIG. 38 is a flow chart showing the process wherein the calibration data of the network printer 50 is generated by the network terminal 10 and then the generated data is stored in the printer profile to form and store the calibration profile.

DETAILED DESCRIPTION OF THE PREFERRED EMBODIMENTS

First Embodiment

Hereinafter, one embodiment of the present invention will be explained with reference to the accompanying drawings.

Figure 1:
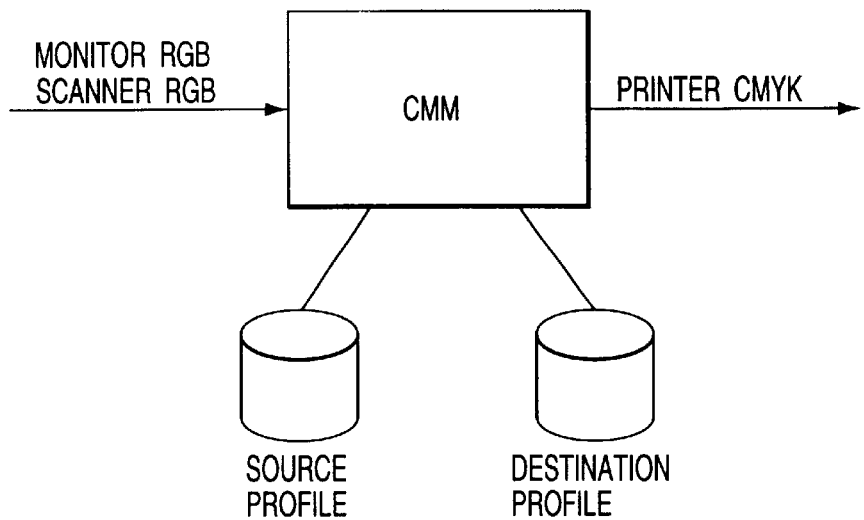
FIG. 1 is a view showing a concept of a color management system.
Figure 2:
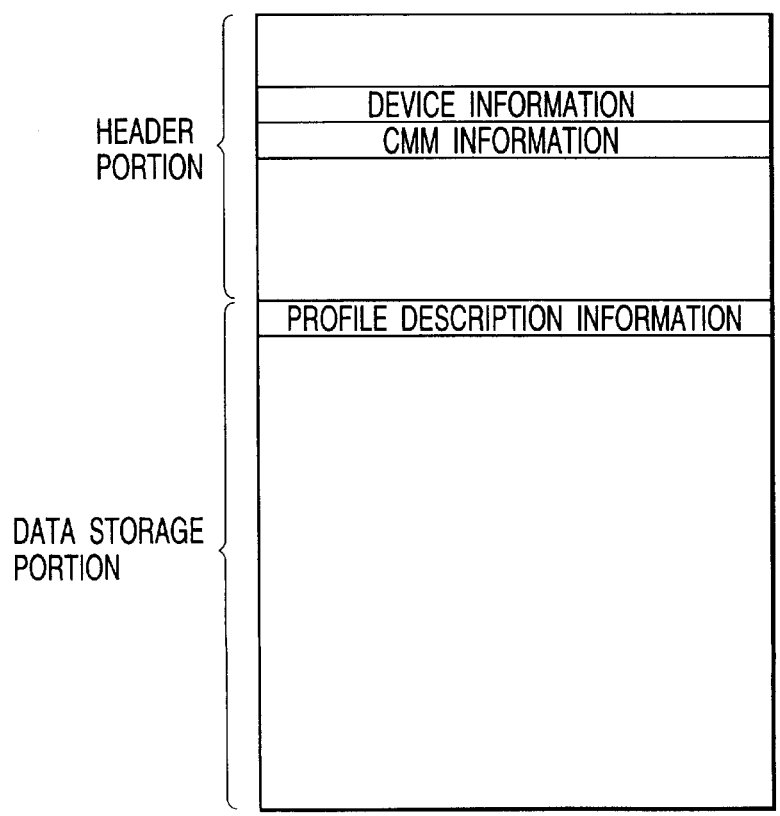
FIG. 2 is a view showing an example of the structure of a device profile.
Figure 3:
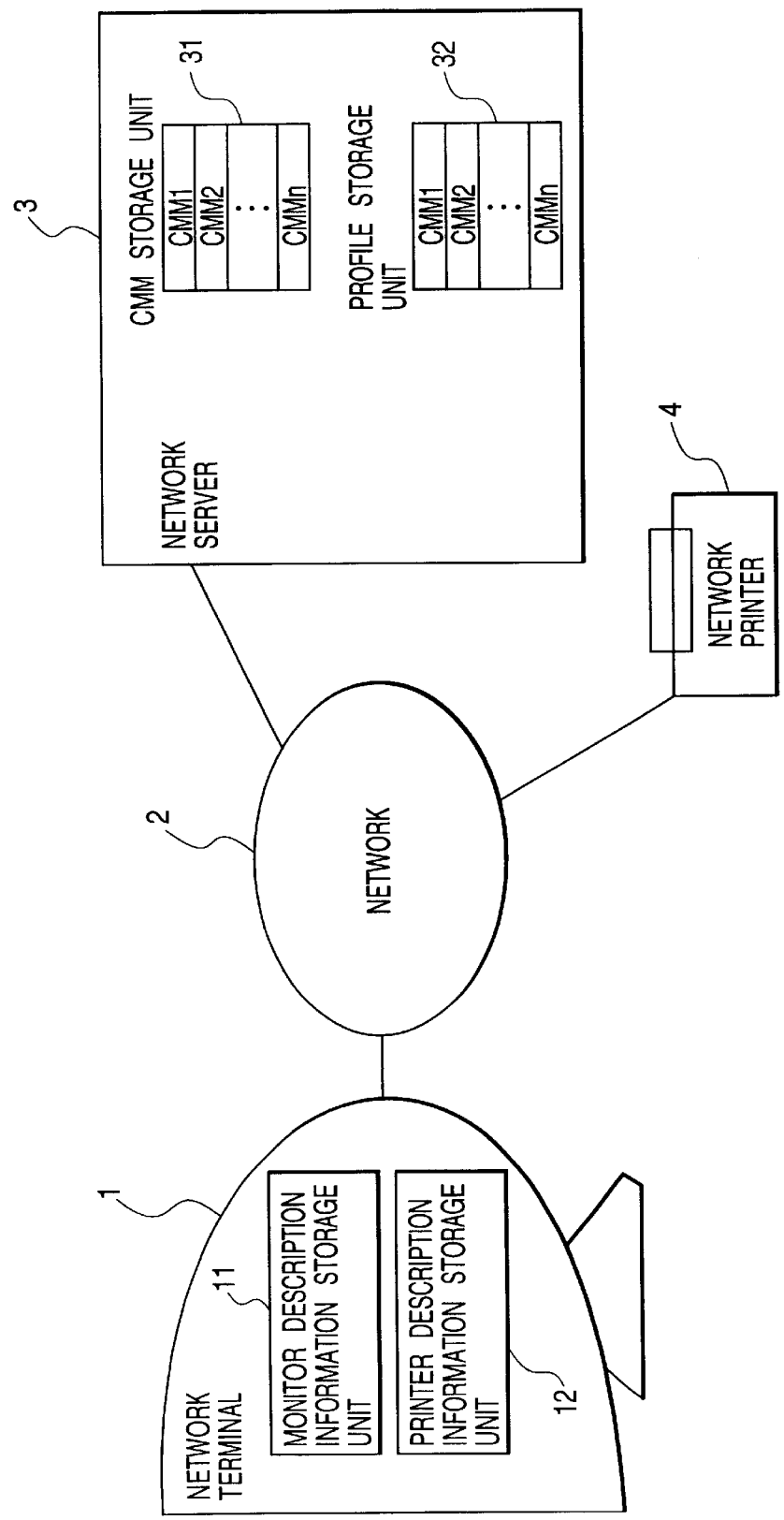
FIG. 3 is a view showing the structure of a network system according to one embodiment of the present invention.

FIG. 3 is a view showing structure of a network system according to one embodiment of the present invention.

As shown in FIG. 3, the network system according to the present embodiment is composed of a network terminal 1, a network server 3 and a network printer 4, and a network 2 to which these three devices are connected.

The network terminal 1 has a CPU, a VRAM and the like necessary for monitor displaying and image processing, and a communication function necessary for a communication in the network. Further, the network terminal 1 has a monitor description information storage unit 11 for discriminating a monitor and a printer description information storage unit 12 for discriminating the network printer 4.

The network server 3 has a CPU, a RAM, a hard disk and the like necessary for image processing and printing processing, and a communication function necessary for the communication in the network. Further, the network server 3 has a CMM storage unit 31 in which n (constant) CMMs have been stored or registered and a profile storage unit 32 in which m (constant) device profiles (monitor, scanner and printer) have been stored. Each CMM registered in the CMM storage unit 31 has registration information (e.g., four-byte English numerals: UCCM) for discrimination.

Figure 4:
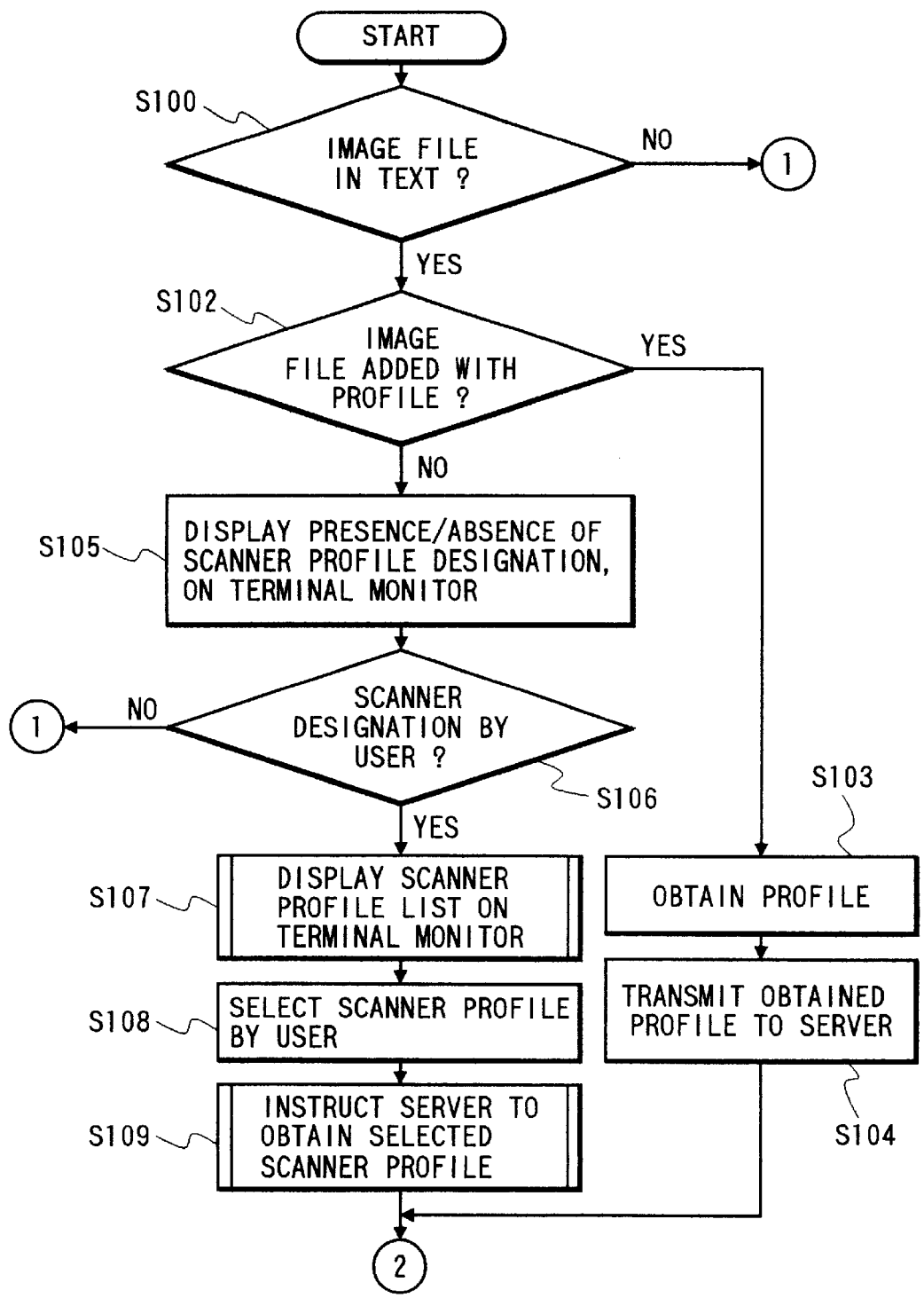
FIG. 4 is a flow chart showing a process wherein, in case of displaying a text at a network terminal 1, if there is an image file in the text, a color matching process on image data in the image file is performed at a network server 3 in accordance with a characteristic of a monitor, and a processed result is displayed on the monitor of the network terminal 1.
Figure 5:
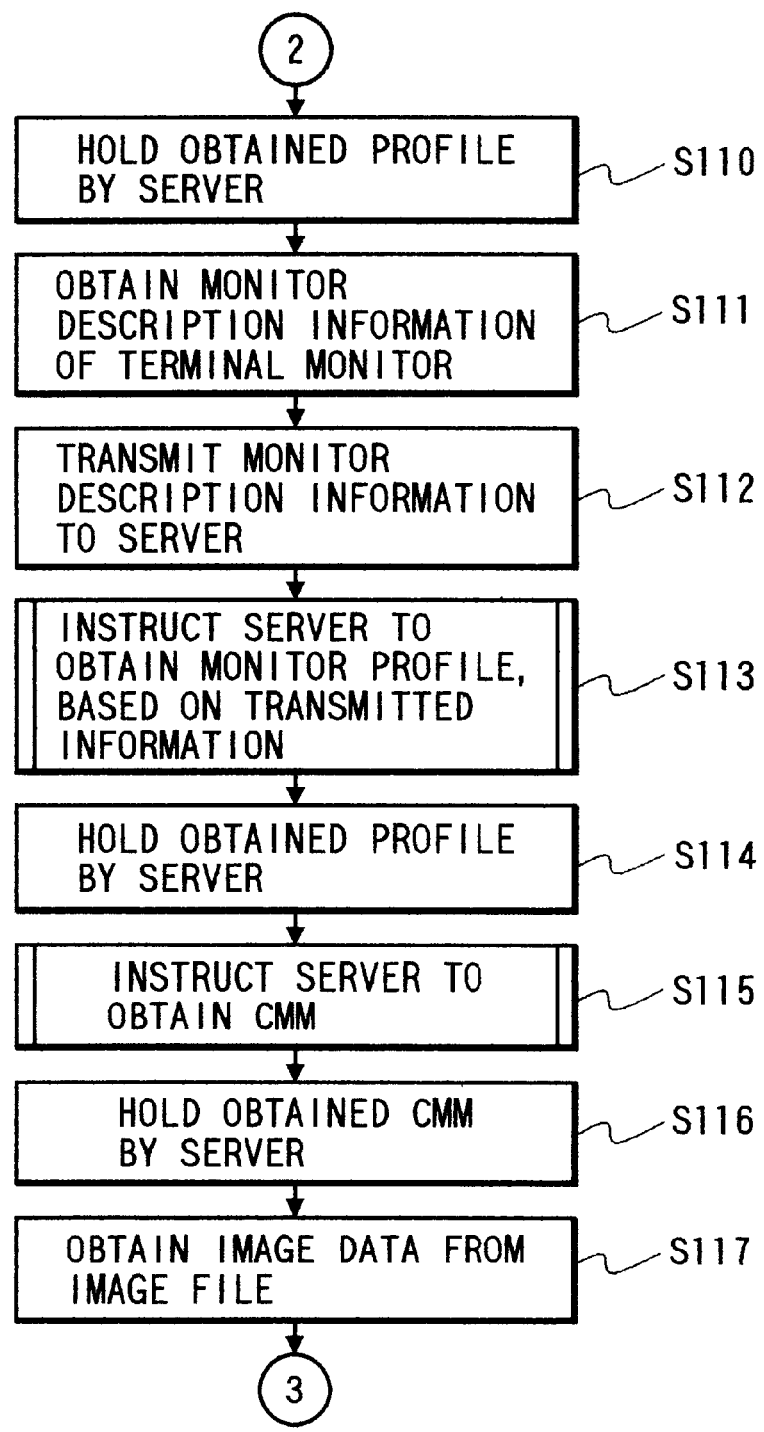
FIG. 5 is a flow chart showing the process wherein, in case of displaying the text at the network terminal 1, if there is the image file in the text, the color matching process on the image data in the image file is performed at the network server 3 in accordance with the characteristic of the monitor, and the processed result is displayed on the monitor of the network terminal 1.
Figure 6:
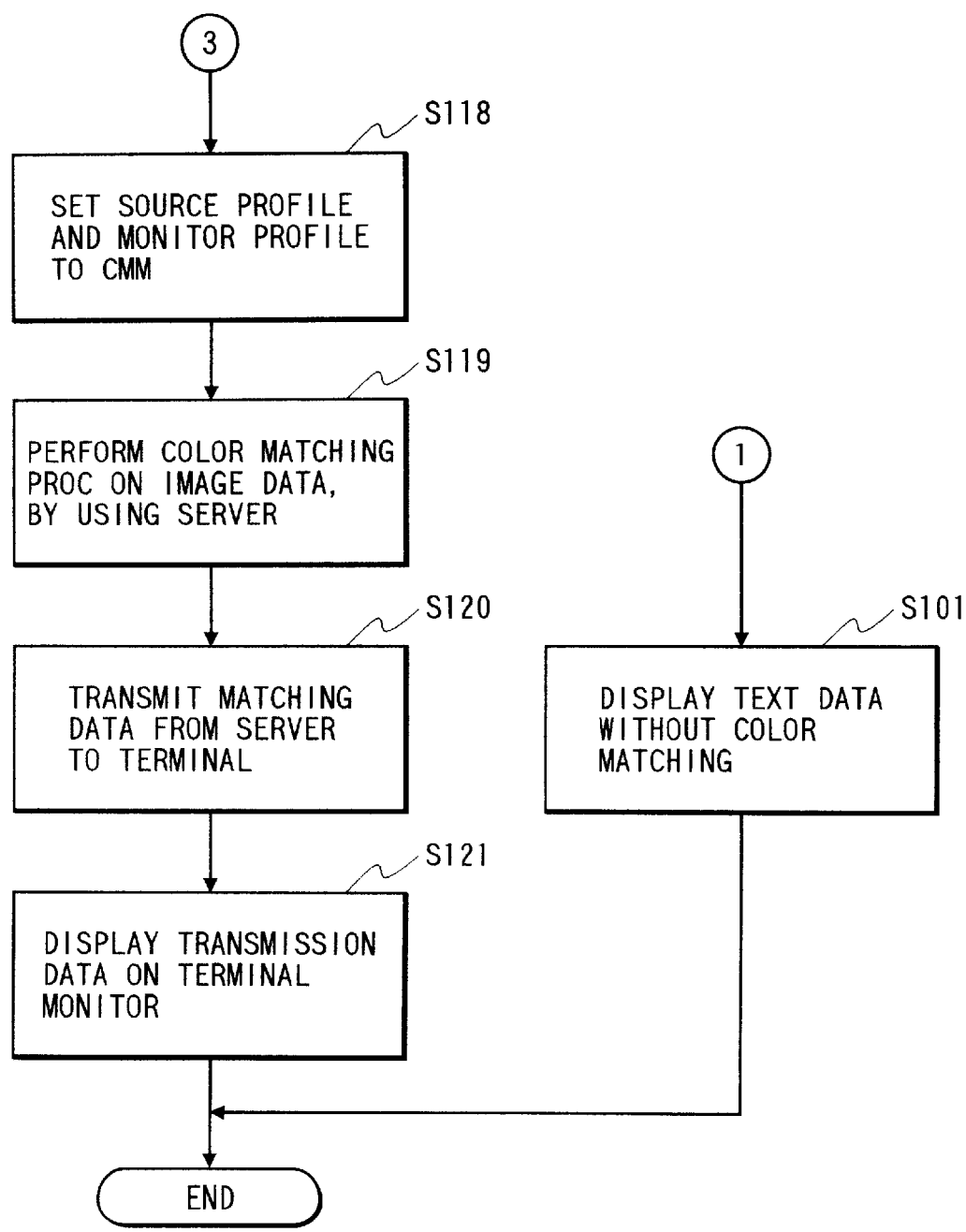
FIG. 6 is a flow chart showing the process wherein, in case of displaying the text at the network terminal 1, if there is the image file in the text, the color matching process on the image data in the image file is performed at the network server 3 in accordance with the characteristic of the monitor, and the processed result is displayed on the monitor of the network terminal 1.

FIGS. 4 to 6 are flow charts showing a process wherein, in case of displaying a text on the network terminal 1, if an image file exists in the text, a color matching process on image data in the image file is performed by the network server 3 in accordance with the characteristic of the monitor of the network terminal 1, and the processed data is displayed on the monitor of the network terminal 1.

In a step S100, it is checked whether or not the image file exists in the text to be displayed. If the image file does not exist, the flow advances to a step S101 to display text data without performing any matching process and terminate the process. On the other hand, if the image file exists, the flow advances to a step S102 to check whether or not the profile is being added to the image file.

If it is found in the step S102 that the profile is being added, the flow advances to a step S103 to obtain (or fetch) the device profile. Then, the flow advances to a step S104.

In the step S104, the profile obtained in the step S103 is transmitted to the network server 3, and the flow advances to a step S110. This profile is the profile for the scanner, the monitor or the like and thus handled as a source profile.

If it is found in the step S102 that the profile is not added, the flow advances to a step S105 to display whether or not the scanner which read the image data is to be designated on the monitor shown in FIG. 19. Then, the flow advances to a step S106.

In the step S106, it is checked whether or not a user instruction designates the scanner. If it is indicated that the user instruction does not designate the scanner, the flow advances to the step S101 to display the text data without performing any matching process and then terminate the process. This is the case where the user can not specify or identify the scanner which read the image data.

If the user instruction designates the scanner in the step S106, the flow advances to a step S107. This is the case where the user can specify or identify the scanner which read the image data.

In the step S107, a list of selectable scanner profiles in the profile storage unit 32 of the network server 3 is displayed on the monitor of the network terminal 1 as shown in FIG. 20. Then, the flow advances to a step S108.

In the step S108, the user selects one scanner profile from the list, and the flow advances to a step S109.

In the step S109, it instructs the network server 3 to obtain the scanner profile selected in the step S108, and the flow advances to the step S110.

In the step S110, the scanner profile obtained in the step S109 is held (or stored) in the network server 3, and the flow advances to a step S111.

In the step S111, monitor description information of the network terminal 1 is obtained from the monitor description information storage unit 11, and the flow advances to a step S112.

In the step S112, the monitor description information obtained in the step S111 is transmitted to the network server 3, and the flow advances to a step S113.

In the step S113, based on the monitor description information transmitted in the step S113, it instructs the network server 3 to obtain the monitor profile, and the flow advances to a step S114.

In the step S114, the monitor profile obtained in the step S113 is held in the network server 3, and the flow advances to a step S115.

In the step S115, it instructs the network server 3 to obtain the CMM, and the flow advances to a step S116.

In the step S116, the CMM obtained in the step S115 is held in the network server 3, and the flow advances to a step S117.

In the step S117, the image data is obtained from the image file in the text, and the flow advances to a step S118.

In the step S118, the source profile obtained in the step S103 or S109 and the monitor profile obtained in the step S113 are set to the CMM, and the flow advances to a step S119.

In the step S119, the color matching process is performed on the image data obtained in the step S117, by using the CMM obtained in the step S118, and the flow advances to a step S120.

In the step S120, the data subjected to the color matching process in the step S119 is transmitted from the network server 3 to the network terminal 1, and the flow advances to a step S121.

In the step S121, the data transmitted in the step S120 is displayed on the monitor of the network terminal 1, and then the process terminates.

According to such the process, it becomes possible to obtain the necessary profile and CMM from the network server 3, perform the color matching process on the image data in the text at the side of the network server 3, and display the processed image data on the monitor of the network terminal 1.

Figure 7:
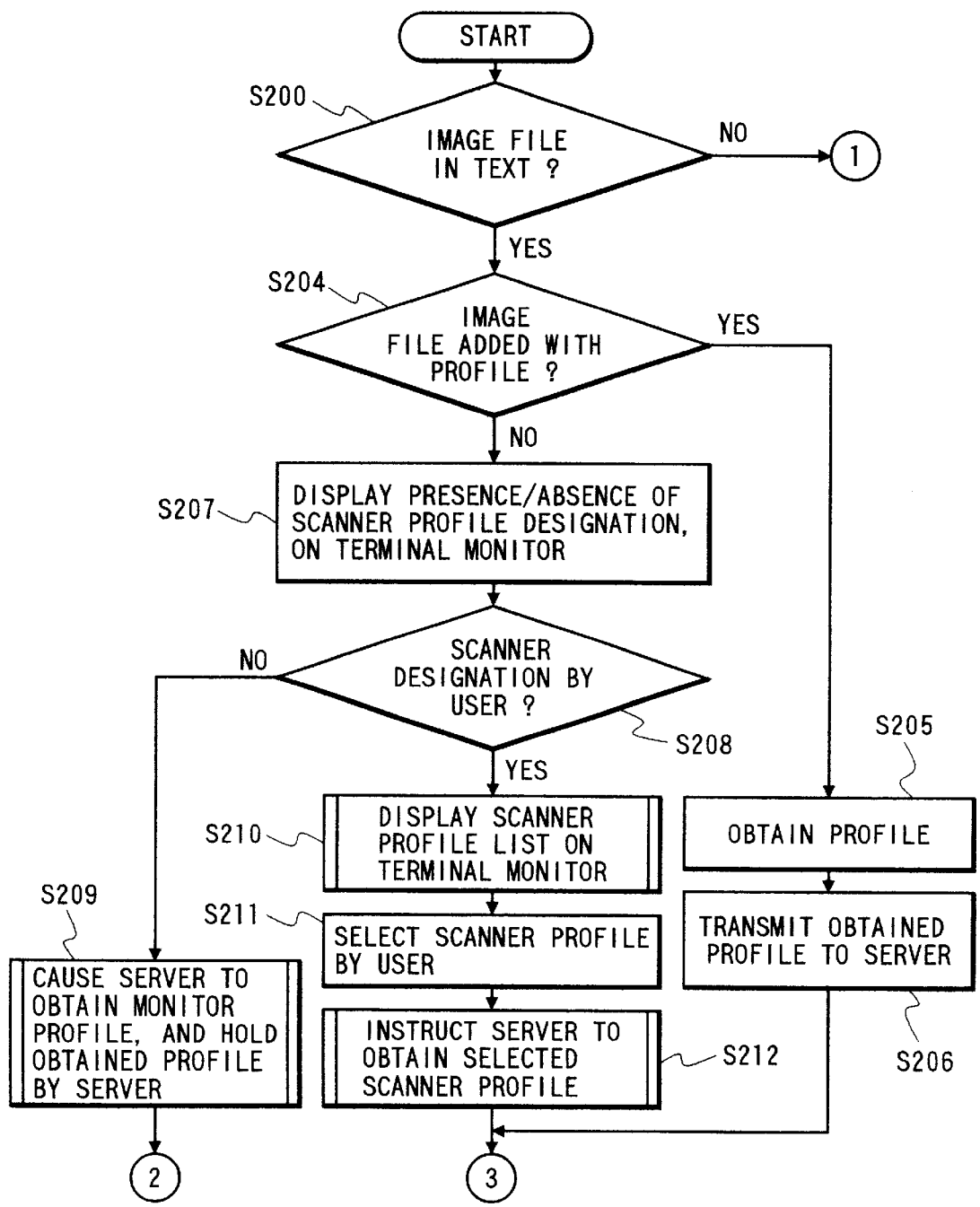
FIG. 7 is a flow chart showing a process wherein, in case of printing the text by using a network printer 4, the color matching process on the data in the text is performed at the network server 3 in accordance with a characteristic of the network printer 4 and then the processed data is outputted to the network printer 4.
Figure 8:
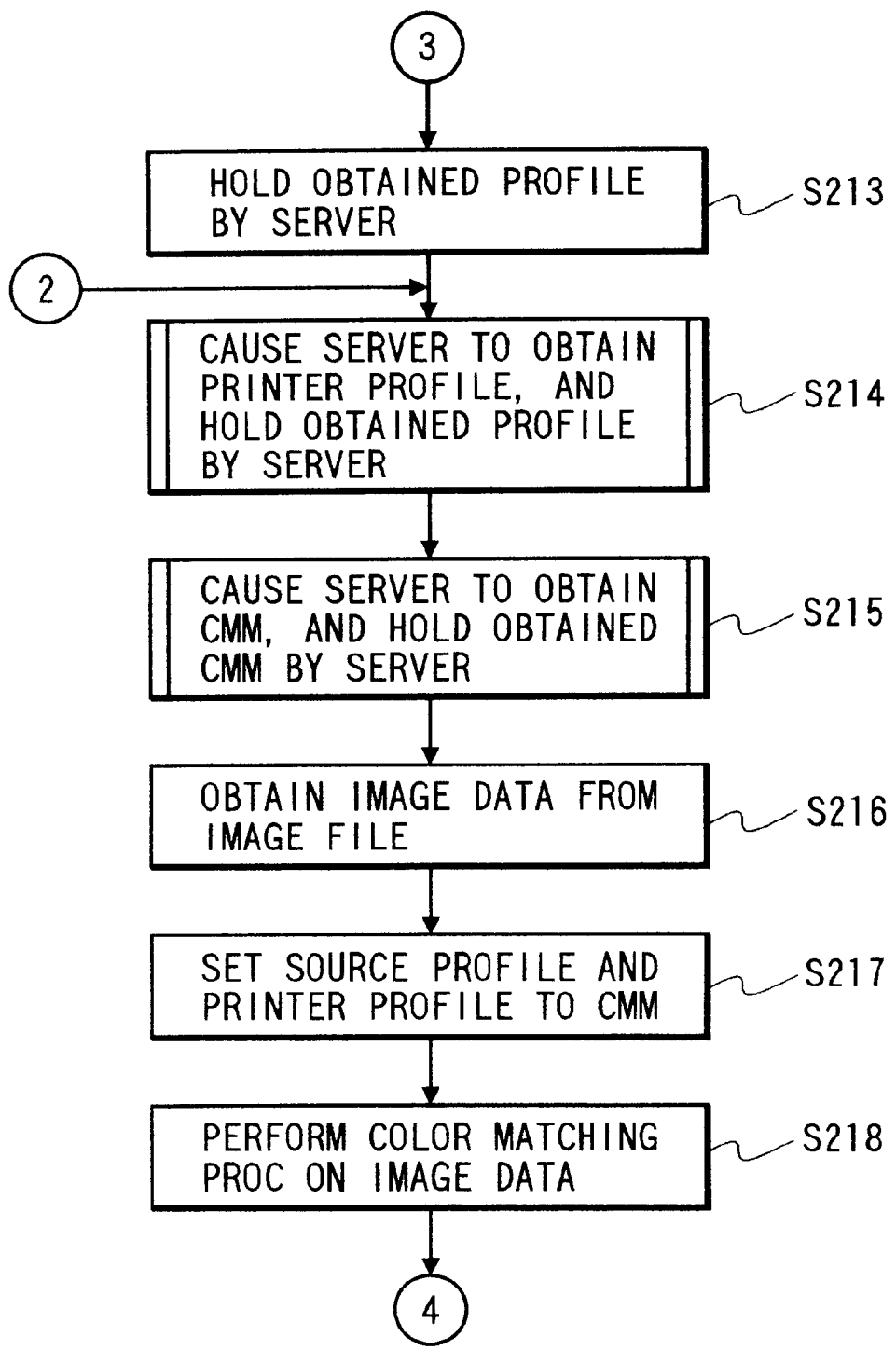
FIG. 8 is a flow chart showing the process wherein, in case of printing the text by using the network printer 4, the color matching process on the data in the text is performed at the network server 3 in accordance with the characteristic of the network printer 4 and then the processed data is outputted to the network printer 4.
Figure 9:
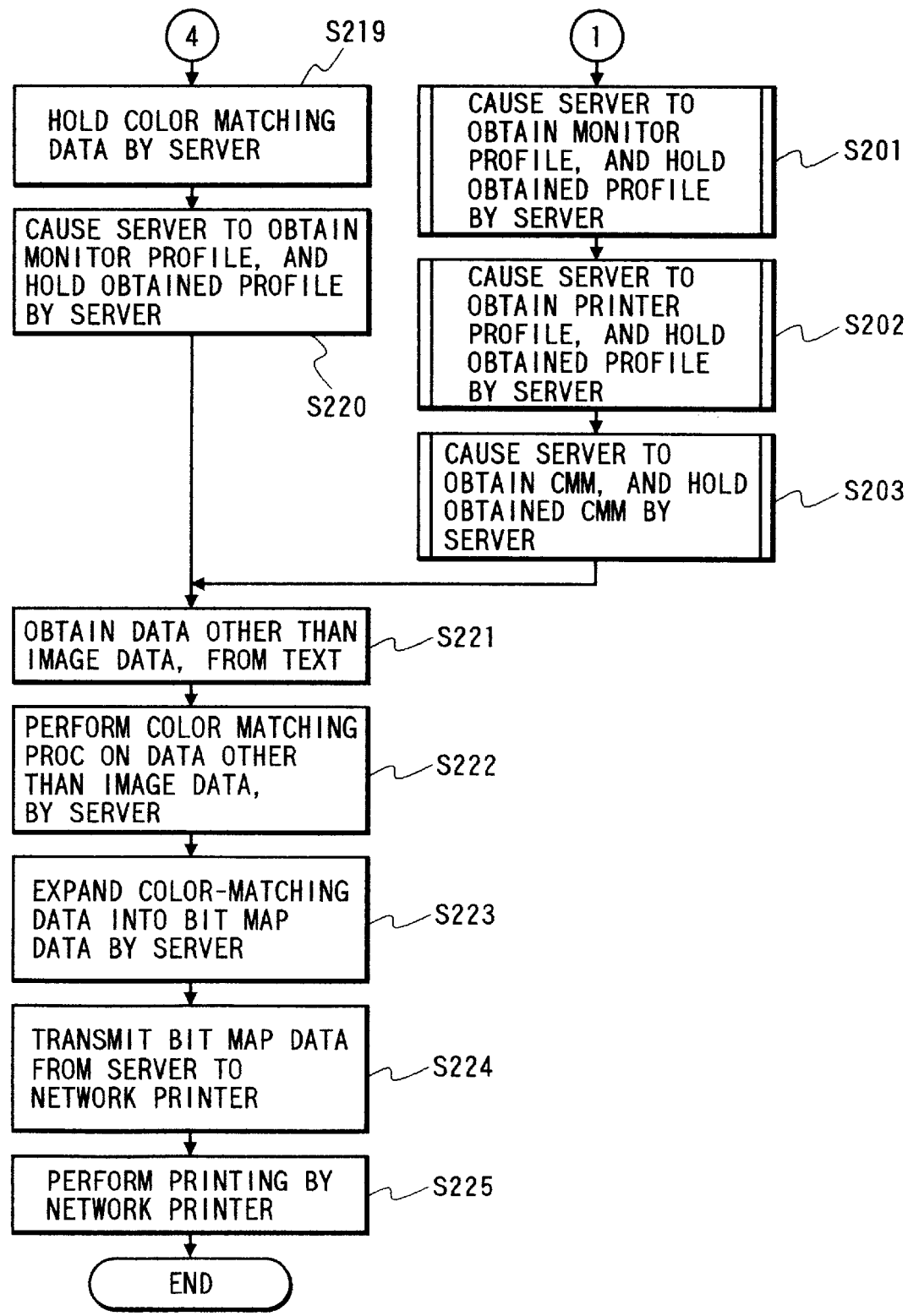
FIG. 9 is a flow chart showing the process wherein, in case of printing the text by using the network printer 4, the color matching process on the data in the text is performed at the network server 3 in accordance with the characteristic of the network printer 4 and then the processed data is outputted to the network printer 4.

FIGS. 7 to 9 are flow charts showing a process wherein, in case of printing the text by using the network printer 4, the color matching process on the data in the text is performed at the network server 3 in accordance with the characteristic of the network printer 4 and then the processed data is outputted to the network printer 4.

In a step S200, it is checked whether or not the image file exists in the text to be printed. If the image file does not exist, it can be considered that all the data in the text were formed on the monitor, whereby the color matching process is performed between the monitor of the network terminal 1 and the network printer 4.

In this case, the flow advances to a step S201 to cause the server to obtain the monitor profile of the monitor of the network terminal 1. The obtained profile is held (or stored) in the network server 3, and then the flow advances to a step S202.

In the step S202, it causes the network server 3 to obtain the printer profile of the network printer 4. The obtained profile is held in the network server 3, and then the flow advances to a step S203.

In the step S203, it causes the network server 3 to obtain the CMM used for the process from the CMM storage unit 31. The obtained CMM is held in the network server 3, and then the flow advances to a step S221.

If the image file exists in the step S200, the flow advances to a step S204 to check whether or not the profile is being added to the image file. If the profile is being added, the flow advances to a step S205 to obtain the device profile, and then the flow advances to a step S206. This profile is the profile for the scanner, the monitor or the like, and is handled as the source profile.

In the step S206, the profile obtained in the step S205 is transmitted to the network server 3, and the step advances to a step S213.

On the other hand, if the profile is not being added in the step S204, the flow advances to a step S207 to display on the monitor a message as to whether or not the scanner which read the image data is to be designated, and then the flow advances to a step S208.

In the step S208, it is checked the user instruction as to whether or not the user designates the scanner. If it is instructed that the user does not designate the scanner, the flow advances to a step S209 to cause the network server 3 to obtain the monitor profile of the monitor of the network terminal 1. The obtained profile is held in the network server 3, and the flow advances to a step S214.

This is the case where the user can not specify the scanner which read the image data, and it is represented that the source device in the color matching on the text is the monitor of the network terminal 1.

On the other hand, if it is instructed to designate the scanner in the step S208, the flow advances to a step S210. This is the case where the user can specify the scanner which read the image data.

In the step S210, the list of the selectable scanner profiles in the profile storage unit 32 of the network server 3 is displayed on the monitor of the network terminal 1, and the flow advances to a step S211.

In the step S211, the user selects one scanner profile from the list, and the flow advances to a step S212.

In the step S212, it instructs the network server 3 to obtain the scanner profile selected in the step S211, and the flow advances to the step S213.

In the step S213, the scanner profile obtained in the step S212 is held by the network server 3, and the flow advances to the step S214.

In the step S214, it instructs the network server 3 to obtain the printer profile of the network printer 4, and the obtained profile is held in the network server 3. Then, the flow advances to a step S215.

In the step S215, it causes the network server 3 to obtain the CMM used in the process from the CMM storage unit 31. The obtained CMM is held in the network server 3, and the flow advances to a step S216.

In the step S216, the image data is obtained from the image file in the text, and the flow advances to a step S217.

In the step S217, the source profile (monitor profile or scanner profile) obtained in the step S205, S209 or S212 and the printer profile obtained in the step S214 are set to the CMM, and the flow advances to a step S218.

In the step S218, the color matching process is performed on the image data obtained in the step S216, by using the CMM in the step S217. Then, the flow advances to a step S219.

According to the process up to this time, it becomes possible to instruct the network server 3 to obtain the necessary profile and CMM and to perform the color matching process on the image data in the text at the side of the network server 3.

Further, in the step S219, the matching data obtained in the step S218 is held in the network server 3, and the flow advances to a step S220.

In the step S220, it instructs the network server 3 to obtain the monitor profile of the monitor of the network terminal 1. The obtained profile is held in the network server 3, and the flow advances to the step S221.

In the step S221, the data (character, graphics and the like) other than the image in the text are obtained, and the flow advances to a step S222.

In the step S222, the monitor profile (source profile) obtained in the step S201 or S220 and the printer profile obtained in the step S202 or S214 are set to the CMM obtained in the step S203 or S215, the color matching process is performed on the data other than the image obtained in the step S221, and the flow advances to a step S223.

By such the process, it becomes possible to instruct the network server 3 to obtain the necessary profile and CMM, and perform the color matching process on the data other than the image in the text at the side of the network server 3.

In the step S223, the data color matching processed in the steps S218 and S222 are expanded to the bit map data in the network server 3 such that the color-matched data can be outputted by the network printer. Then, the flow advances to a step S224.

In the step S224, the bit map data expanded in the step S223 is transmitted from the network server 3 to the network printer 4 through the network 2, and the flow advances to a step S225.

In the step S225, the bit map data transmitted in the step S224 is received and printed by the network printer 4, and then the process terminates.

As explained above, according to the present embodiment, it becomes possible to instruct the network server 3 to obtain the necessary profile and CMM, perform the color matching process on the image data in the text and the data other than the image at the side of the network server 3, and print the processed data by the network printer 4.

Figure 10:
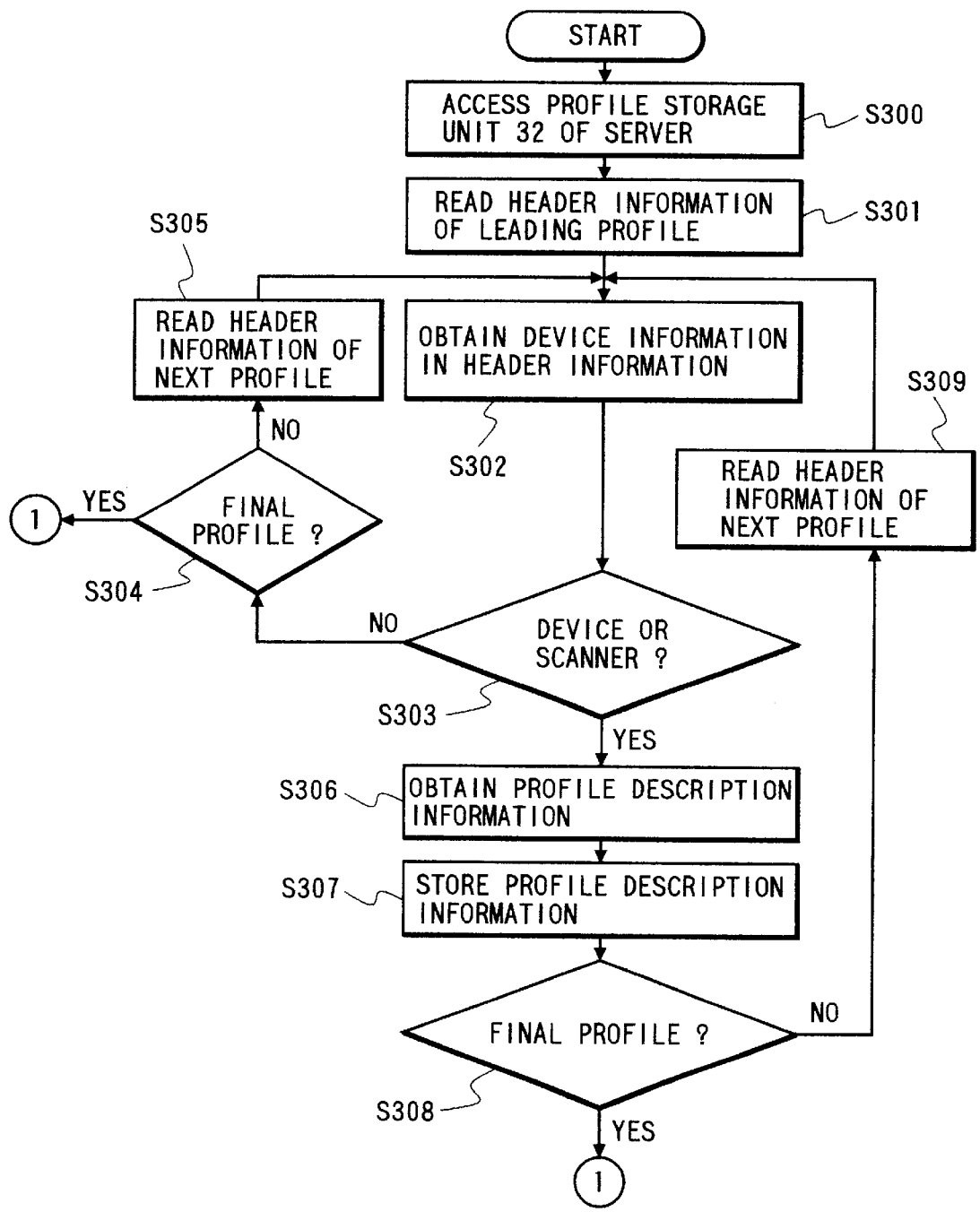
FIG. 10 is a flow chart showing detailed processes in a step S107 of FIG. 4 and a step S210 of FIG. 7.
Figure 11:
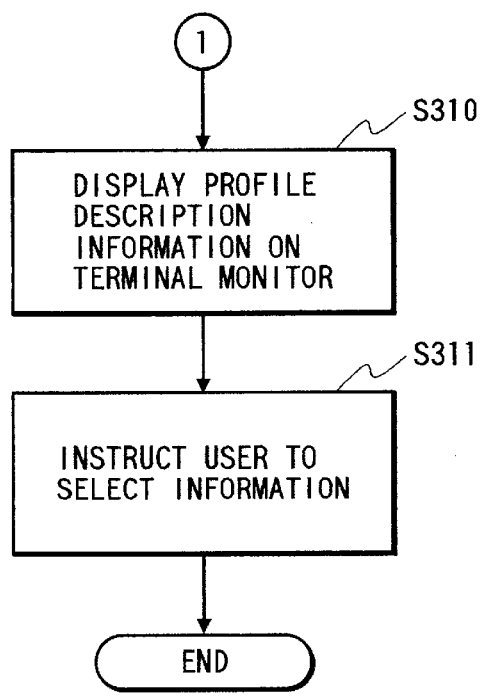
FIG. 11 is flow chart showing the detailed processes in the step S107 of FIG. 4 and the step S210 of FIG. 7.

FIGS. 10 and 11 are flow charts for explaining in detail the processes in the steps S107 and S210 wherein the list of the selectable scanner profiles in the profile storage unit 32 of the network server 3 is displayed on the monitor of the network terminal 1.

In a step S300, the profile storage unit 32 of the network server 3 is accessed, and the flow advances to a step S301.

In the step S301, information of a header portion (i.e., header information) of the leading profile in the profile storage unit 32 is read, and the flow advances to a step S302.

In the step S302, device information is obtained (or fetched) from the header information read in the step S301, and the flow advances to a step S303.

In the step S303, it is checked whether or not the device information represents the scanner. If the device information represents a device other than the scanner, the flow advances to a step S304 to check whether or not the profile from which the header information is currently read is the final profile. If the final profile, the flow advances to a step S310. On the other hand, if not the final profile, the flow advances to a step S305 to read the header information of the next profile, and then the flow returns to the step S302.

If it is found in the step S303 that the device information represents the scanner, the flow advances to a step S306 to obtain the profile description information in the data storage portion of the profile. Then, the flow further advances to a step S307.

In the step S307, the profile description information obtained in the step S306 is temporarily stored in the RAM or the like of the network terminal 1, and the flow advances to a step S308.

In the step S308, it is checked whether or not the profile from which the header information is currently read is the final profile. If not the final profile, the flow advances to a step S309 to read the header information of the next profile, and the flow returns to the step S302. On the other hand, if the final profile, the flow advances to the step S310 to display the profile description information temporarily stored in the step S307 on the monitor as the list, and the flow advances to a step S311.

In the step S311, it is displayed on the monitor a screen for urging the user to select which of the information, and then the process terminates.

That is, it becomes possible to display such the list of the selectable scanner profiles stored in the profile storage unit 32 of the network server 3, on the monitor of the network terminal 1.

Figure 12:
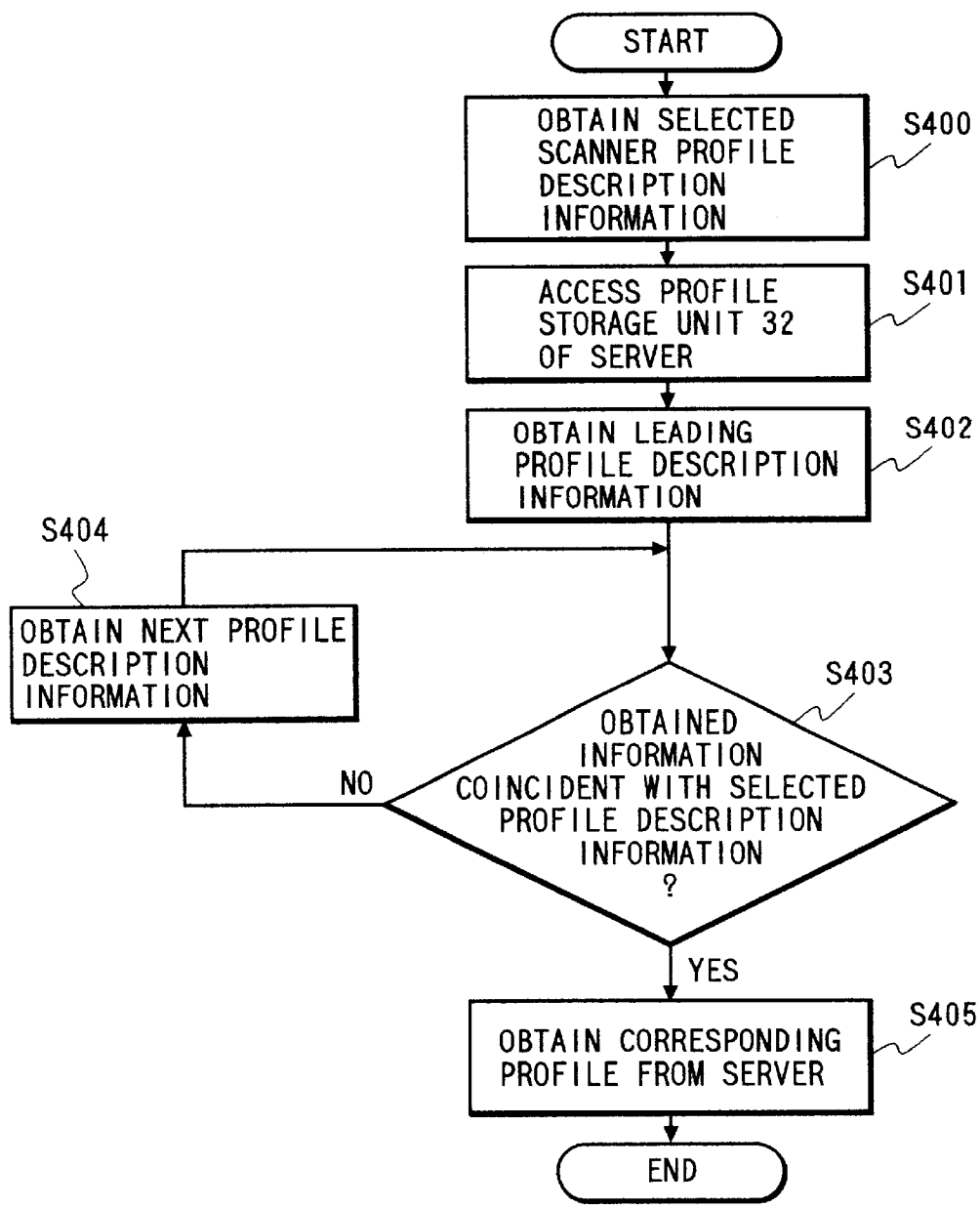
FIG. 12 is a flow chart showing detailed processes in a step S109 of FIG. 4 and a step S212 of FIG. 7.

FIG. 12 is a flow chart showing in detail the processes in the steps S109 and S212 to instruct the network server 3 to obtain the scanner profile selected by the user.

In a step S400, the profile description information of the data storage portion of the selected scanner profile is obtained, and the flow advances to a step S401.

In the step S401, the profile storage unit 32 of the network server 3 is accessed, and the flow advances to a step S402.

In the step S402, the profile description information of the data storage portion of the leading profile in the profile storage unit 32 is obtained, and the flow advances to a step S403.

In the step S403, it is checked whether or not the profile description information obtained in the step S402 is coincident with the profile description information obtained in the step S400. If not coincident, the flow advances to a step S404 to obtain the profile description information of the data storage portion of the next profile, and the flow returns to the step S403. On the other hand, if coincident in the step S403, the flow advances to a step S405 to obtain such the profile from the network server 3, and then the process terminates.

As above, it is possible to instruct the network server 3 to obtain the scanner profile designated by the user.

Figure 13:
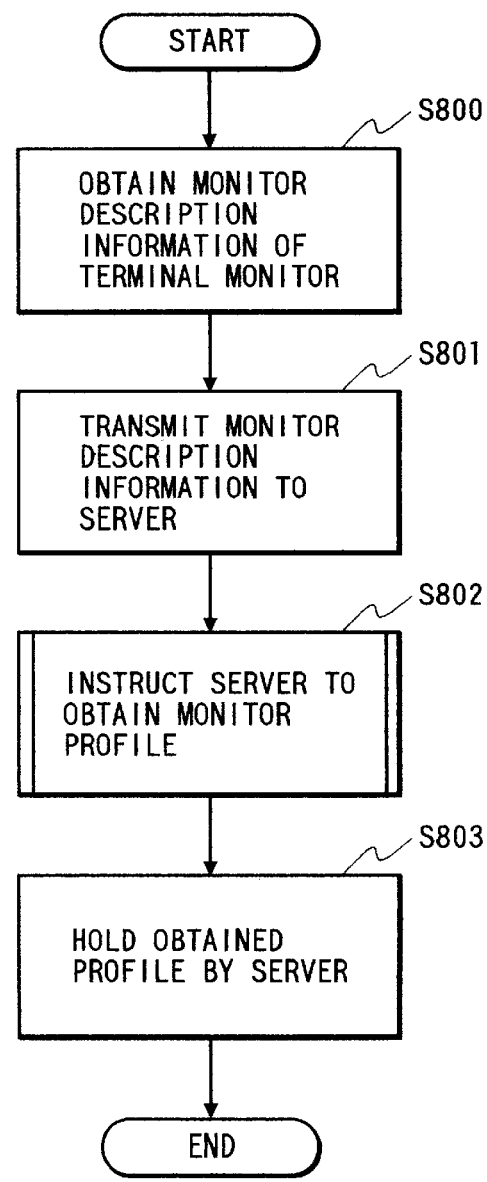
FIG. 13 is a flow chart showing detailed processes in a step S113 of FIG. 5, a step S201 of FIG. 9 and a step S207 of FIG. 7.

FIG. 13 is a flow chart showing in detail the processes in the steps S113, S201, S209 and S220 to instruct the network server 3 to obtain the monitor profile of the monitor of the network terminal 1 and hold the obtained profile in the server.

In a step S800, the monitor profile description information of the network terminal 1 is obtained from the monitor description information storage unit 11, and the flow advances to a step S801.

In the step S801, the monitor profile description information obtained in the step S800 is transmitted to the network server 2 through the network 2, and the flow advances to a step S802.

In the step S802, based on the monitor profile description information transmitted in the step S801, it instructs the network server 3 to obtain the monitor profile of the network terminal 1, and the flow advances to a step S803.

In the step S803, the monitor profile obtained in the step S802 is held in the network server 3, and then the process terminates.

By such the process, it is possible to instruct the network server 3 to obtain the monitor profile of the monitor of the network terminal 1 and hold the obtained profile in the server.

Figure 14:
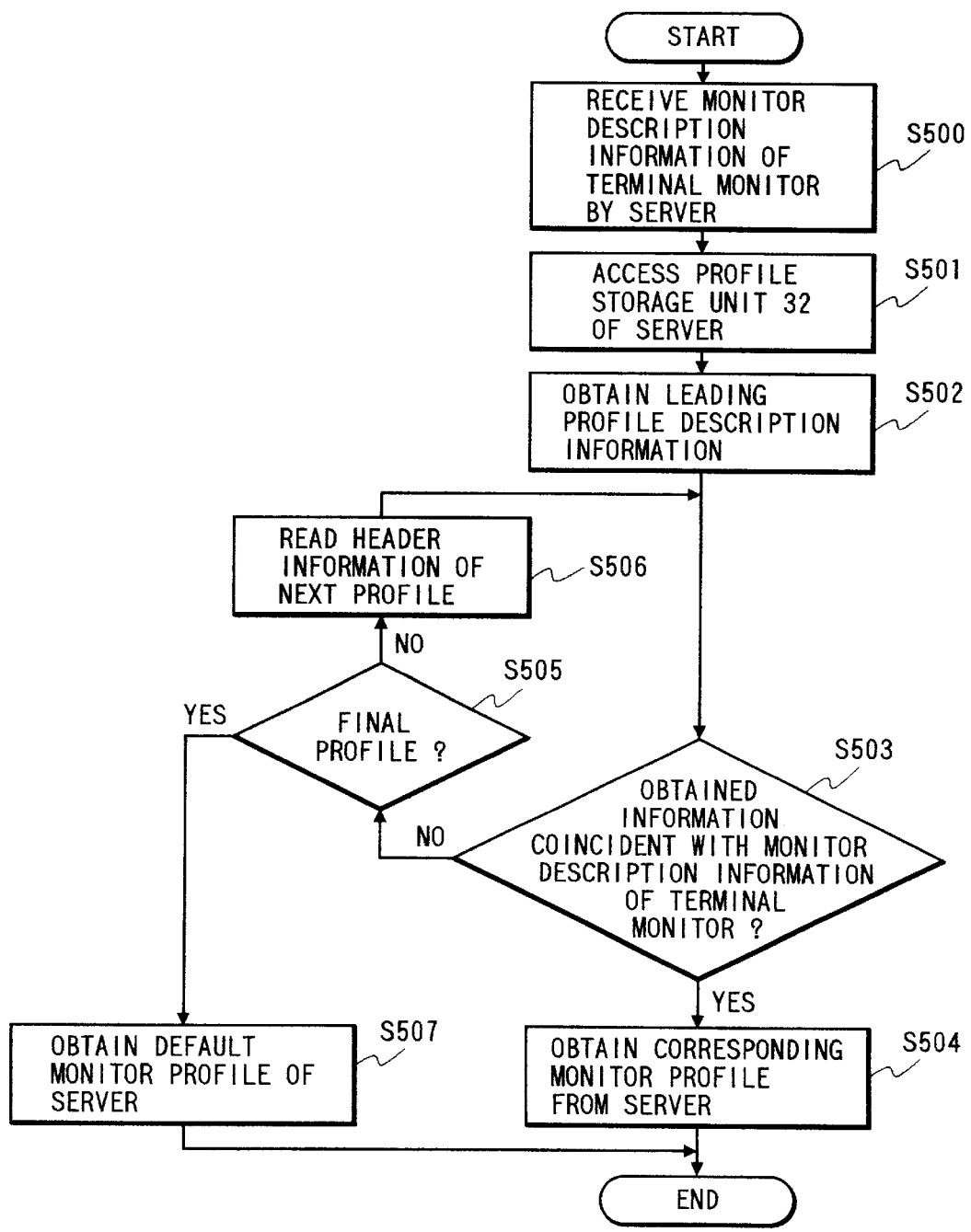
FIG. 14 is a flow chart showing a detailed process in a step S802 of FIG. 13.

FIG. 14 is a flow chart showing in detail the process in the step S802 to instruct the network server 3 to hold the monitor profile of the monitor of the network terminal 1 on the server side.

In a step S500, the monitor description information of the monitor of the network terminal 1 is received by the network server 3, and the flow advances to a step S501.

In the step S501, the profile storage unit 32 of the network server 3 is accessed, and the flow advances to a step S502.

In the step S502, the profile description information of the data storage portion of the leading profile in the profile storage unit 32 is obtained, and the flow advances to a step S503.

In the step S503, it is checked whether or not the profile description information obtained in the step S502 is coincident with the monitor description information obtained in the step S500. If not coincident, the flow advances to a step S505 to check whether or not the profile from which the profile description information is currently read is final.

If final, the flow advances to a step S507 to obtain the default monitor profile of the network server 3 stored in the profile storage unit 32, and then the process terminates. On the other hand, if not final, the flow advances to a step S506 to obtain the profile description information of the data storage portion of the next profile, and the flow returns to the step S503.

If coincident in the step S503, the flow advances to a step S504 to obtain such the profile from the network server 3, and then the process terminates.

By such the process, it becomes possible to instruct the network server 3 to obtain the monitor profile of the monitor of the network terminal 1.

Figure 15:
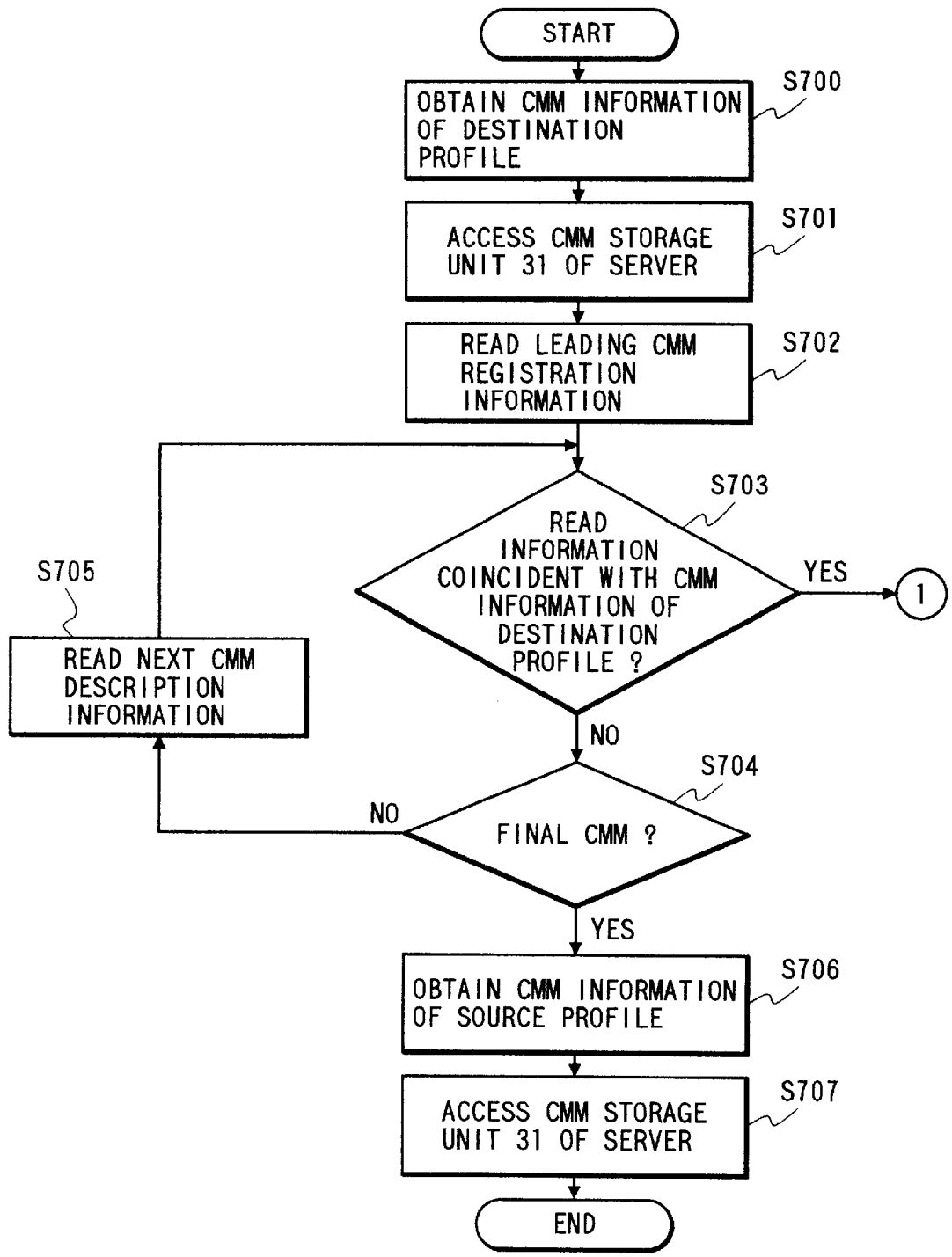
FIG. 15 is a flow chart showing detailed processes in a step S115 of FIG. 5, a step S215 of FIG. 8 and a step S203 of FIG. 9.
Figure 16:
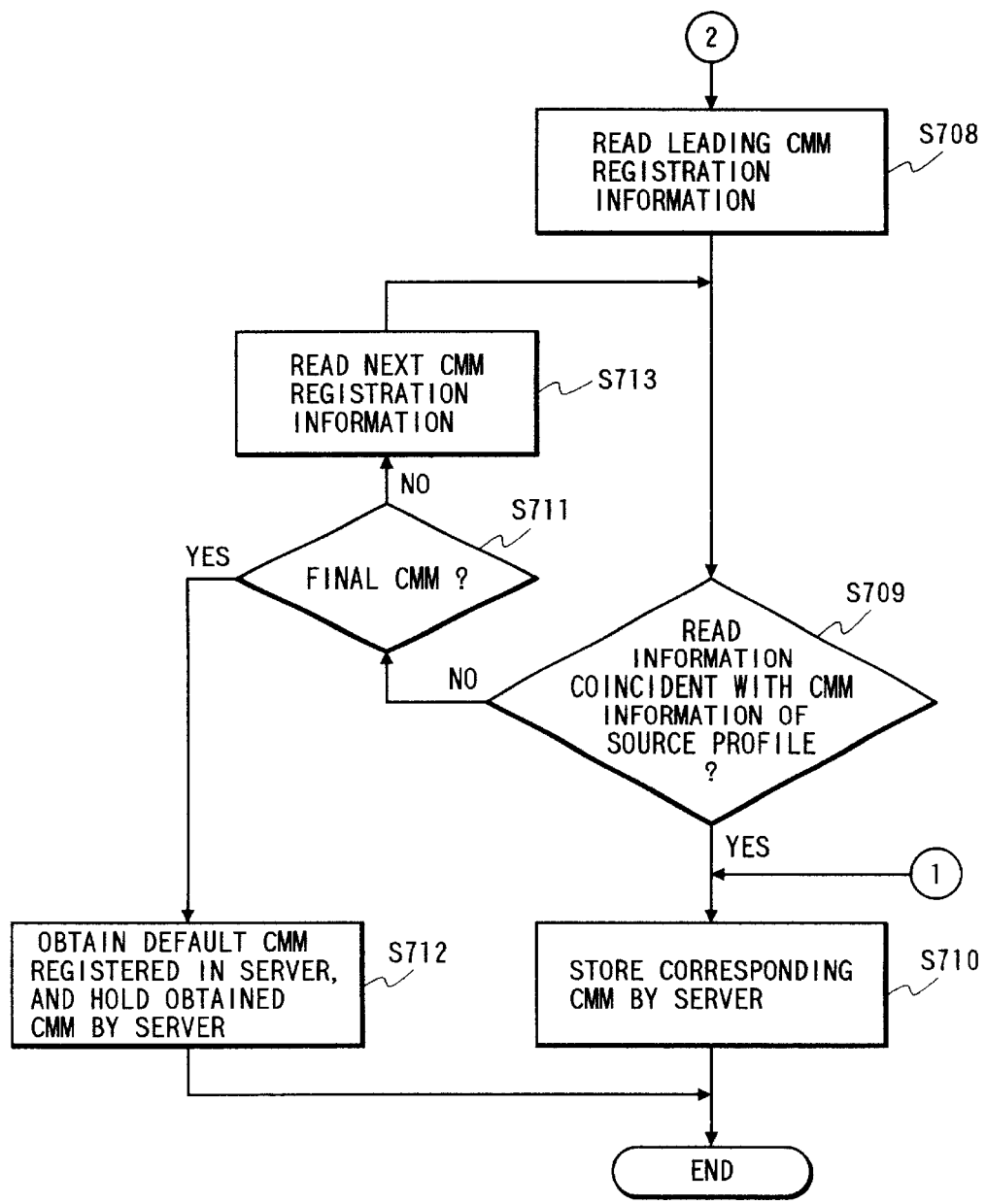
FIG. 16 is a flow chart showing the detailed processes in the step S115 of FIG. 5, the step S215 of FIG. 8 and the step S203 of FIG. 9.

FIGS. 15 and 16 are flow charts showing in detail the processes in the steps S115, S203 and S215 to instruct the network server 3 to obtain the CMM used for the color matching process and hold the obtained CMM in the network server 3.

In a step S700, the CMM information of the destination profile (monitor profile in case of performing monitor displaying, or printer profile in case of performing printing) is held, and the flow advances to a step S701.

In the step S701, the CMM storage unit 31 of the network server 3 is accessed, and the flow advances to a step S702.

In the step S702, the leading CMM registration information in the CMM storage unit 31 is obtained, and the flow advances to a step S703.

In the step S703, it is checked whether or not the CMM information obtained in the step S702 is coincident with the CMM information held in the step S700. If coincident, the flow advances to a step S710. On the other hand, if not coincident, the flow advances to a step S704 to check whether or not the CMM of which the registration information is currently read is final.

If not final, the flow advances to a step S705 to read the next CMM registration information, and the flow returns to the step S703. On the other hand, if final, the flow advances to a step S706 to obtain the CMM information of the source profile, and the flow advances to a step S707.

In the step S707, the CMM storage unit 31 of the network server 3 is accessed, and the flow advances to a step S708.

In the step S708, the CMM registration information of the leading profile in the CMM storage unit 31 is obtained, and the flow advances to a step S709.

In the step S709, it is checked whether or not the CMM information obtained in the step S708 is coincident with the CMM information of the source profile obtained in the step S706. If not coincident, the flow advances to a step S711 to check weather or not the profile from which the CMM registration information is currently read is final.

If final, the flow advances to a step S712 to obtain and download the default CMM of the network server 3 stored in the CMM storage unit 31, and then the process terminates. On the other hand, if not final, the flow advances to a step S713 to obtain the CMM registration information of the next profile, and the flow returns to the step S709.

If coincident in the step S709, the flow advances to the step S710 to obtain such the CMM from the network server 3 and hold the obtained CMM in the network server 3, and then the process terminates.

By such the process, it becomes possible to instruct the network server 3 to obtain the CMM used for the color matching process and hold the obtained CMM in the network server 3.

Figure 17:
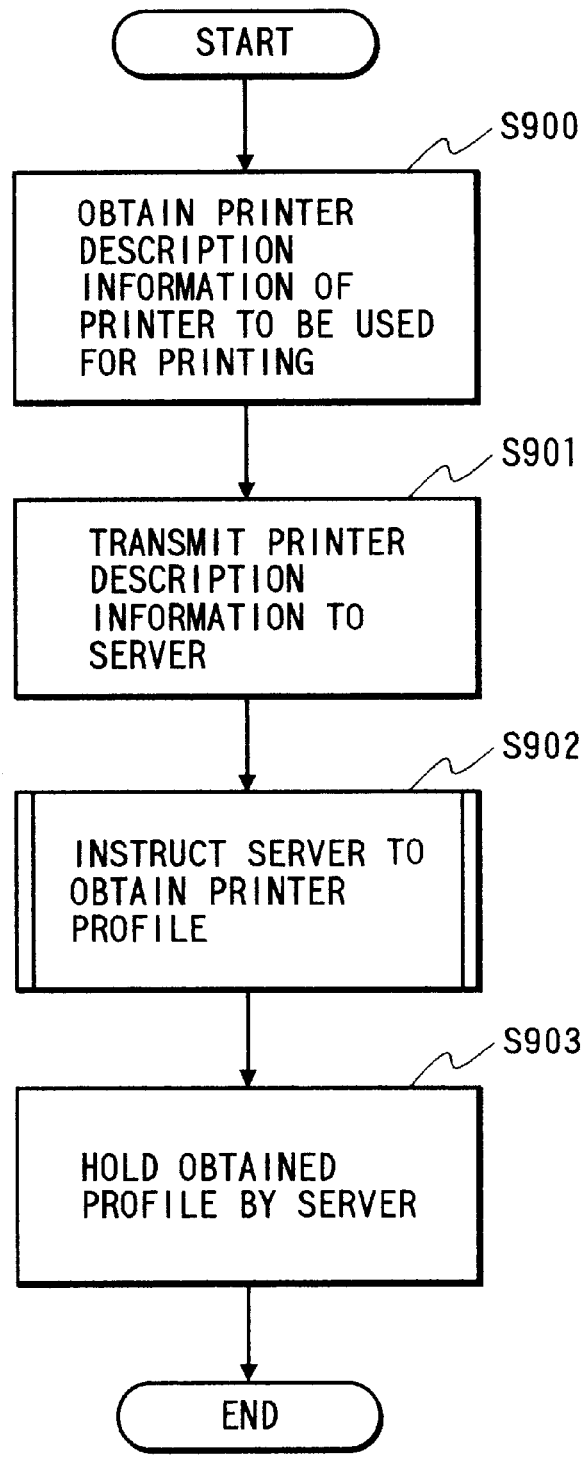
FIG. 17 is a flow chart showing detailed processes in a step S214 of FIG. 8 and a step S202 of FIG. 9.

FIG. 17 is a flow chart showing in detail the processes in the steps S202 and S214 to instruct the network server 3 to obtain the printer profile of the network printer 4 and hold the obtained profile in the network server 3.

In a step S900, the printer profile description information of the network printer 4 is obtained from the printer description information storage unit 11, and the flow advances to a step S901.

In the step S901, the printer profile description information obtained in the step S900 is transmitted to the network server 3 through the network 2, and the flow advances to a step S902.

In the step S902, based on the printer profile description information transmitted in the step S901, it is instructed the network server 3 to obtain the printer profile of the network printer 4, and the flow advances to a step S903.

In the step S903, the printer profile obtained in the step S902 is held in the network server 3, and then the process terminates.

By such the process, it is possible to instruct the network server 3 to obtain the printer profile of the network printer 4 and hold the obtained profile in the server.

Figure 18:
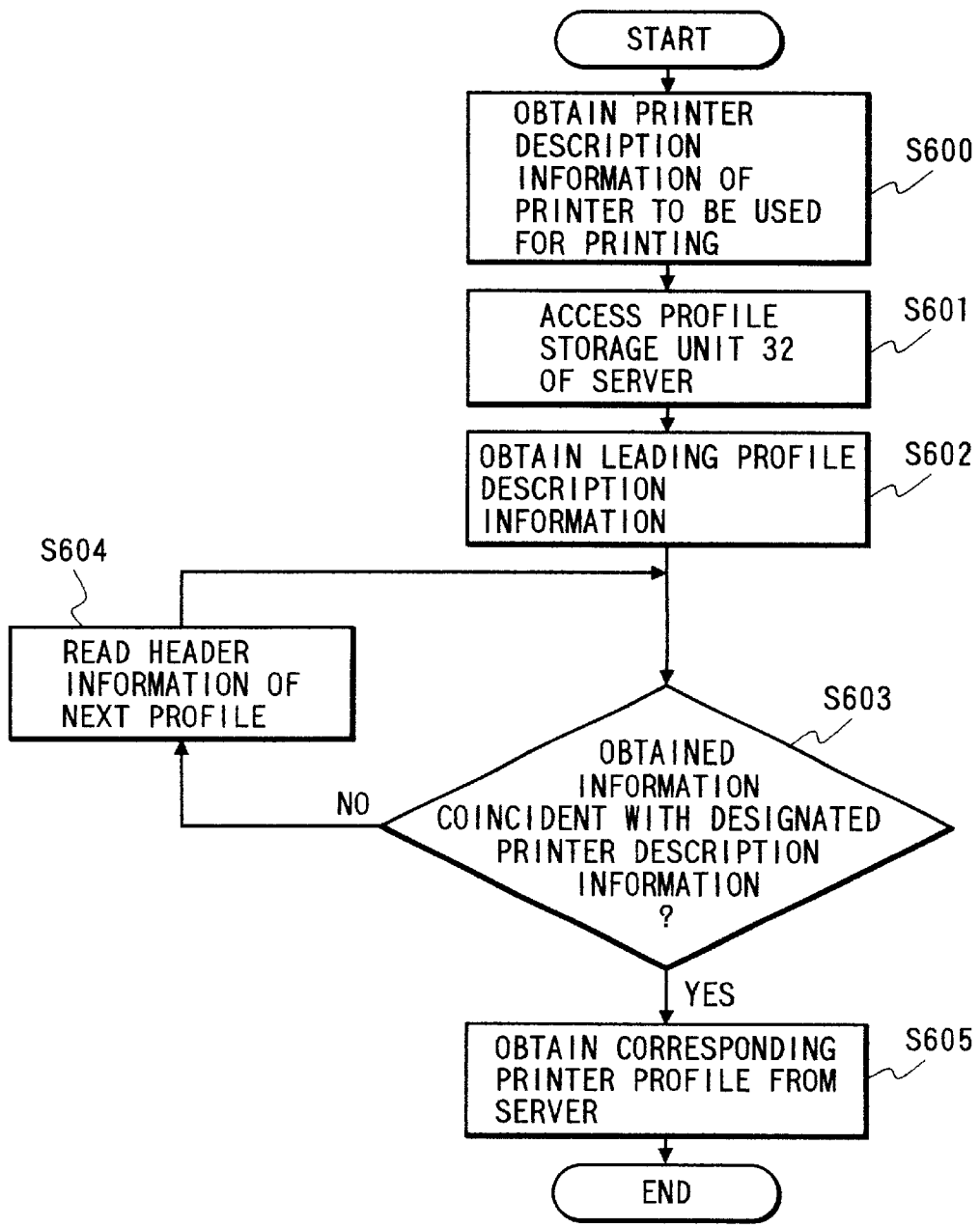
FIG. 18 is a flow chart showing a detailed process in a step S902 of FIG. 17.

FIG. 18 is a flow chart showing in detail the process in the step S902 to instruct the network server 3 to obtain the printer profile of the network printer 4.

In a step S600, the printer description information of the network printer 4 is obtained from the printer description storage unit 12, and the flow advances to a step S601.

In the step S601, the profile storage unit 32 of the network server 3 is accessed, and the flow advances to a step S602.

In the step S602, the profile description information of the data storage portion of the leading profile in the profile storage unit 32 is obtained, and the flow advances to a step S603.

In the step S603, it is checked whether or not the profile description information obtained in the step S602 is coincident with the printer description information obtained in the step S600. If not coincident, the flow advances to a step S604 to obtain the profile description information of the data storage portion of the next profile, and the flow returns to the step S603. On the other hand, if coincident, the flow advances to a step S605 to obtain and download such the profile from the network server 3, and then the process terminates.

By such the process, it becomes possible to instruct the network server 3 to obtain the printer profile of the network printer 4. FIG. 19 shows an example of the user interface used in the step S106 in FIG. 4 or the step S208 in FIG. 7. In the drawing, it has been selected the state that the user designates the scanner.

FIG. 20 shows an example of the user interface used in the step S107 in FIG. 4 or the step S210 in FIG. 7. In the drawing, a list of maker names and product (i.e., scanner) names is displayed.

In FIG. 20, an arrow indicates the maker name "C company" and the product name "A-4015". Therefore, if the user depresses a selection button as it is, the scanner A-4015 manufactured by the C company is selected.

Second Embodiment

In the first embodiment, the profile stored in the network server does not change according to changes in the characteristic of the device.

Therefore, there is the problem to be improved in the first embodiment, i.e., when the characteristic of the device changed due to a change in time elapse and a change in environment, the well color matching process becomes impossible.

In the second embodiment, as a modification of the first embodiment, a system having a calibration function for profile will be explained.

Figure 21:
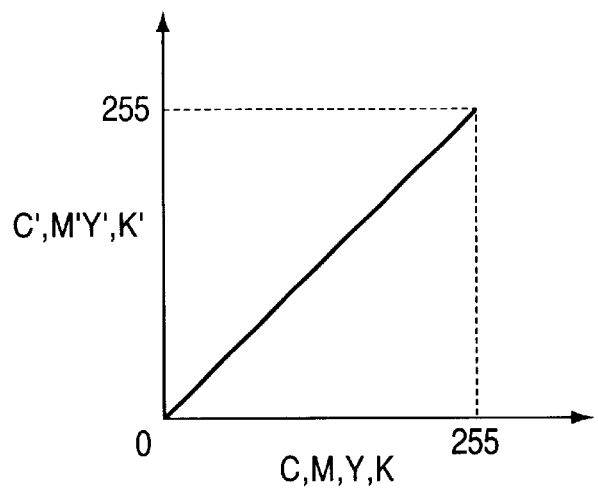
FIG. 21 is a view for explaining calibration of a printer.
Figure 22:
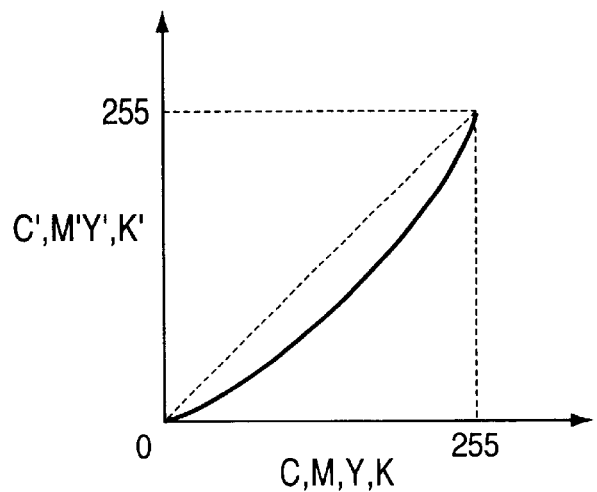
FIG. 22 is a view showing a change in printing density.
Figure 23:
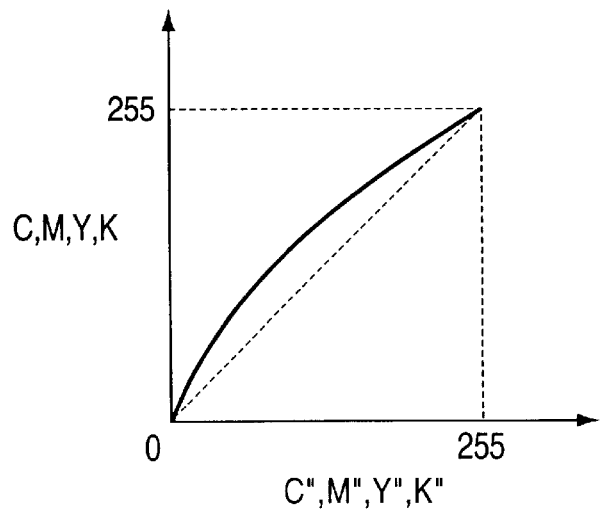
FIG. 23 is a view showing a correction to cancel the change in FIG. 22.

FIGS. 21 to 23 are views for explaining calibration of a printer.

In the drawings, reference symbols C, M, Y and K denote densities of the printer, each of which has been normalized as eight-bit data.

In an initial state, since there is no change in density, the densities C, M, Y and K respectively have the same values of densities C', M', Y' and K' as shown in FIG. 21. However, since printing density changes due to influence of temperature, humidity, time-elapse change and the like, it occurs a case where the densities C, M, Y and K do not have the same values of the densities C', M', Y' and K' as shown in FIG. 22.

Therefore, in order to correct such the state as shown in FIG. 22, it is necessary to set a correction process for canceling the change in FIG. 22. Such the process is generally called as a calibration process.

In the present embodiment, the correction process can be performed by converting densities C", M", Y" and K" into the densities C, M, Y and K before inputting the densities C, M, Y and K in FIG. 21.

Figure 24:
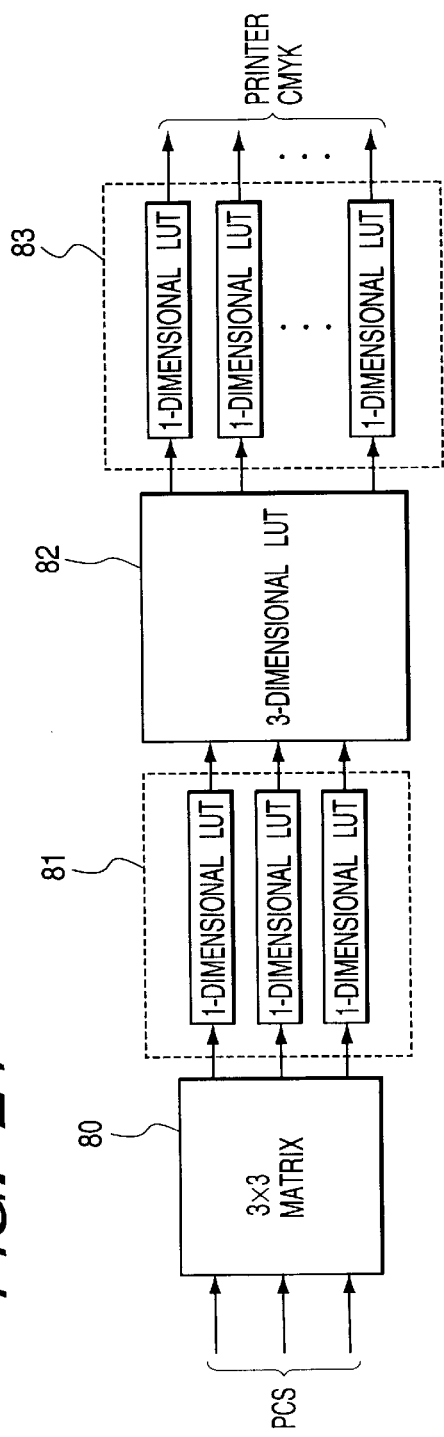
FIG. 24 is a view for explaining data which is stored in a data storage portion of a printer profile and used for color matching.

FIG. 24 is a view for explaining data which is stored in a data storage portion of the printer profile and used for the color matching. This data is based on a profile format standard of ICC (International Color Consortium). That is, in case of converting a PCS (profile connection space: CIE XYZ or CIE Lab) which is a color space not depending on a device into a printer color space (CMYK in this case), the data used for the conversion sequentially performed in processes 80 to 83 is stored in the printer profile. In the drawing, the reference numeral 80 denotes the matrix calculation of three rows and three columns, 81 and 83 denote the processes through one-dimensional LUTs (look-up table), and 82 denotes the process through a three-dimensional LUT.

Figure 25:
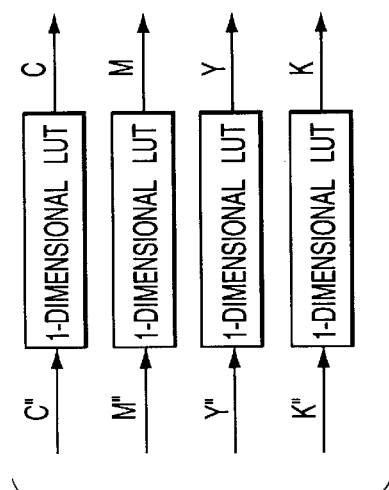
FIG. 25 is a view showing an-example of a process 83 in FIG. 24.

FIG. 25 is a view showing a case where the input and output data of the process 83 and C, M, Y and K data (i.e., densities). By inputting the correction data for calibration in this process, the correction process shown in FIG. 23 is performed.

As above, the calibration process is performed in the color matching, by using a part of the data in the printer profile.

Figure 27:
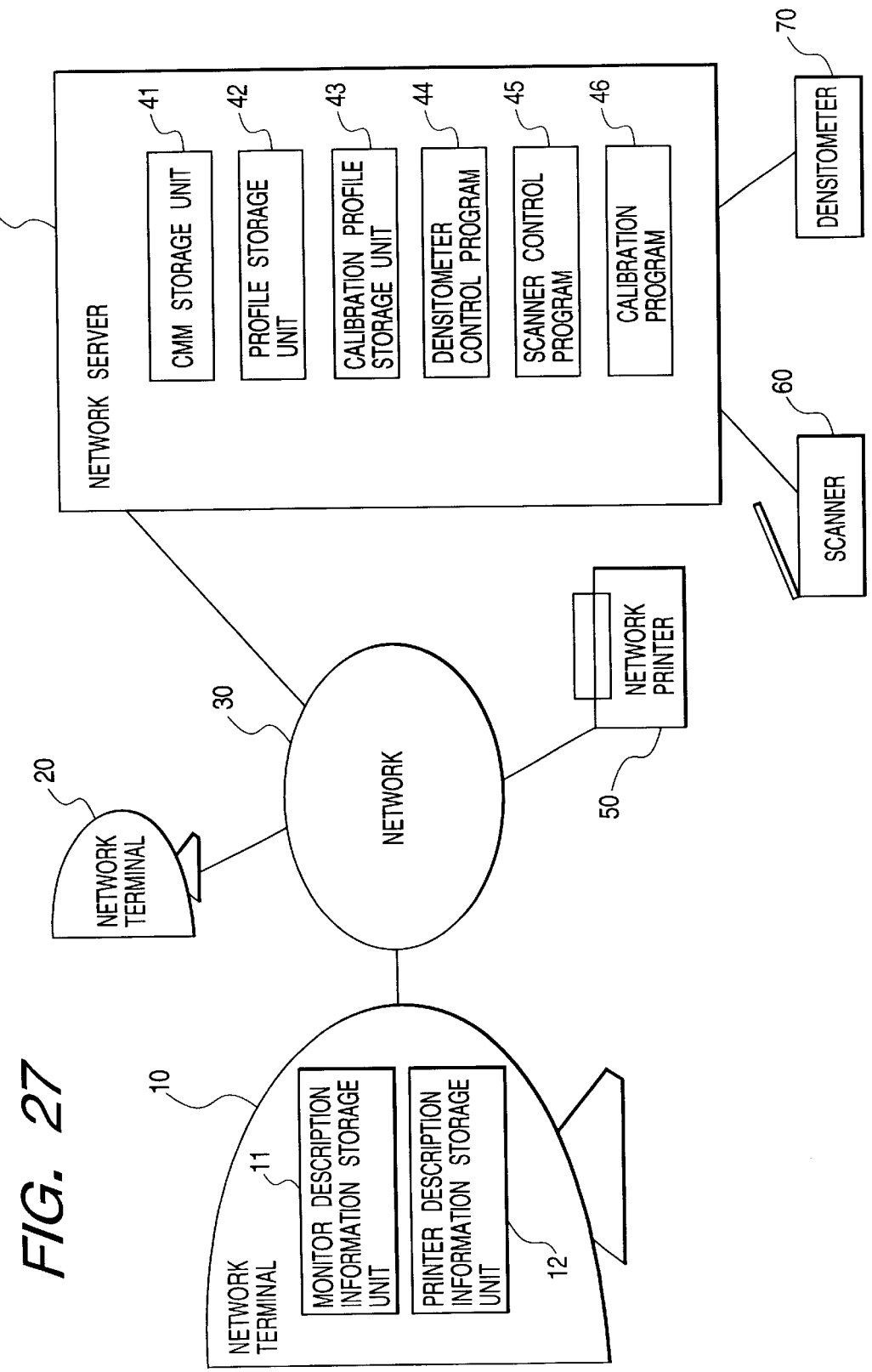
FIG. 27 is a view showing structure of a network system according to a second embodiment.

FIG. 27 is a view showing structure of a network system according to the present embodiment.

As shown in FIG. 27, the network system according to the present embodiment is composed of network terminals 10 and 20, a network server 40, a network printer 50, a scanner 60, a densitometer 70, and a network 30 to which the network terminals 10 and 20, the network server 40 and the network printer 50 are connected.

The network terminal 10 has a CPU, a VRAM and the like necessary for monitor displaying and image processing, and a communication function necessary for the communication in the network. Further, the network terminal 10 has a monitor description information storage unit 11 for discriminating a monitor and a printer description information storage unit 12 for discriminating the network printer 50.

The network server 40 has a CPU, a RAM, a hard disk and the like necessary for image processing and printing processing, and a communication function necessary for the communication in the network. Further, the network server 40 has a CMM storage unit 41 in which n (n is constant)

CMMs have been registered, a profile storage unit 42 in which m (m is constant) device profiles (monitor, scanner and printer) have been stored, a calibration profile storage unit 43 in which the printer profile containing therein calibration data has been stored, a densitometer control program 44 which has a function for controlling the densitometer to measure density of color patch output and obtaining or capturing the measured data, a scanner control program 45 which has a function for controlling the scanner to read the color patch output and obtaining or capturing the read data, and a calibration program 46 which has a function for generating the calibration data based on the data obtained by the densitometer control program 44 and the scanner control program 45.

The scanner 60 and the densitometer 70 are connected to the network server 40.

Each CMM registered or stored in the CMM storage unit 41 has registration information (e.g., four-byte English numerals: UCCM) for discrimination.

Figure 26:
FIG. 26 is a view showing an example of a user interface (i.e., dialog) to cause a user to select accuracy of the calibration.

FIG. 26 shows a user interface (dialog) which is used in case of causing a user to select calibration accuracy. In this case, if the user wishes the accuracy higher than ordinary accuracy, he may select "high".

Figure 28:
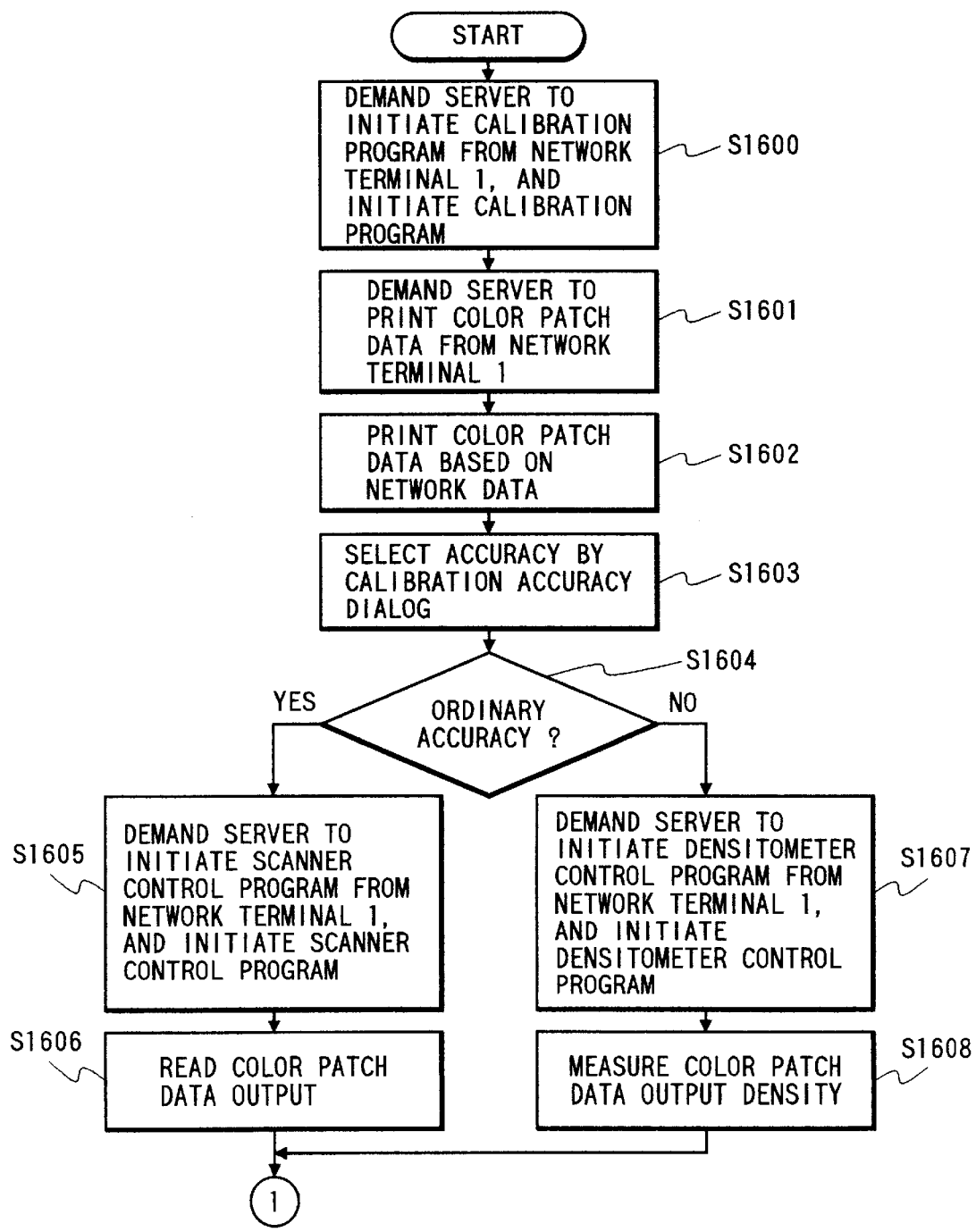
FIG. 28 is a flow chart showing a process wherein calibration data of a network printer 50 is generated by a network server 40 and then the generated data is stored in a printer profile to form and store a calibration profile.
Figure 29:
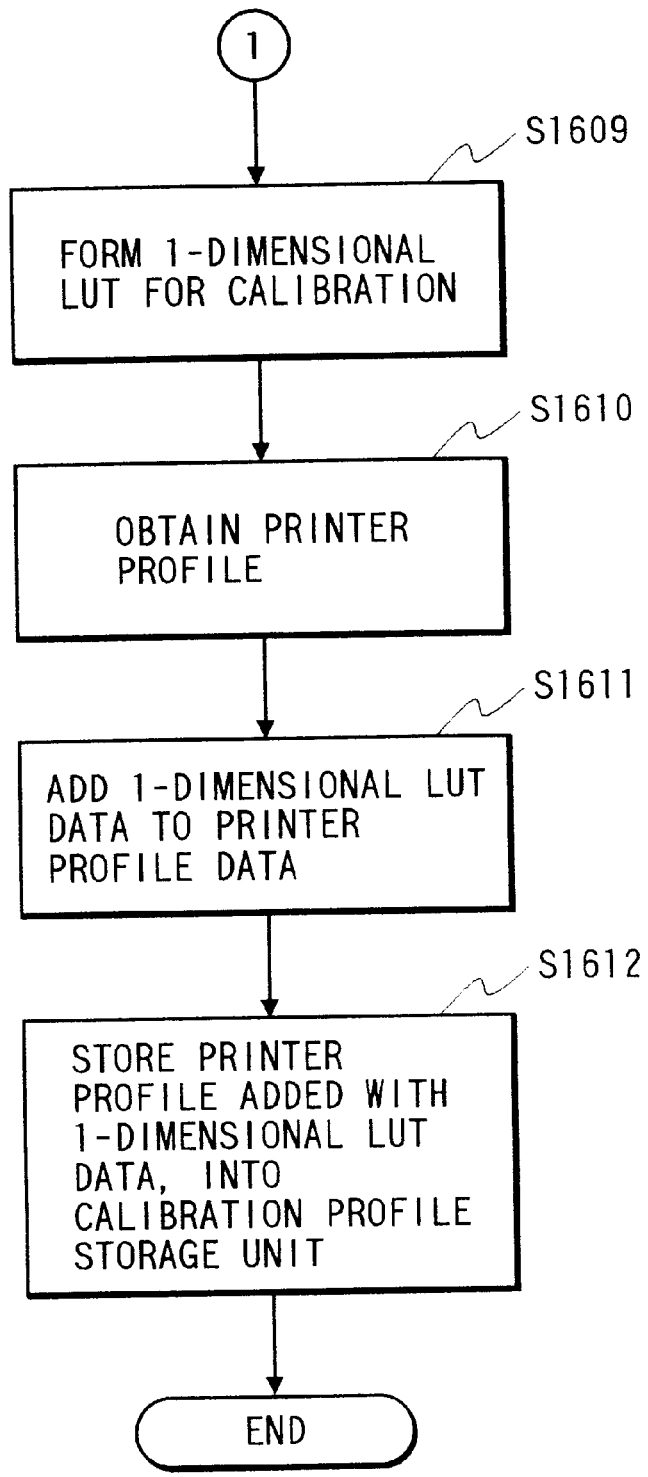
FIG. 29 is a flow chart showing the process wherein the calibration data of the network printer 50 is generated by the network server 40 and then the generated data is stored in the printer profile to form and store the calibration profile.

FIGS. 28 and 29 are flow charts showing a process in the network server 40, wherein the calibration data of the network printer 50 is generated, the calibration profile is formed by storing the generated data in the printer profile, and the formed profile is stored independently of the original printer profile corresponding to a kind of device stored in the profile storage unit.

In a step S1600, the network terminal 10 demands the server 40 to initiate the calibration program 46, and the program 46 is initiated. Then, the flow advances to a step S1601.

In the step S1601, the network terminal 10 demands the server 40 to cause the network printer 50 to print color patch data for generating the calibration data, and the flow advances to a step S1602.

In the step S1602, the color patch data is printed by the network printer 50, and the flow advances to a step S1603.

In the step S1603, the dialog for the selection of calibration accuracy shown in FIG. 24 is displayed based on the initiated calibration program 46, and the user selects the accuracy. Then, the flow advances to a step S1604.

In the step S1604, if the user selects the ordinary accuracy, the flow advances to a step S1605. In the step S1605, the network terminal 10 demands the server 40 to initiate the scanner control program 45 in the server 40, and the program 45 is initiated. Then, the flow advances to a step S1606.

In the step S1606, the color patch data output printed in the step S1602 is read by the scanner 60, and the flow advances to a step S1609.

In the step S1604, if the user selects the high accuracy, the flow advances to a step S1607 to demand the network terminal 10 to initiate the densitometer control program 44 in the server 40, and the program 44 is initiated. Then, the flow advances to a step S1608.

In the step S1608, the color patch data output printed in the step S1602 is read by the densitometer 70, and the flow advances to the step S1609.

In the step S1609, based on the data obtained in the step S1606 or S1608, the one-dimensional LUT data shown in FIG. 22 is generated according to the calibration program 46, and the flow advances to a step S1610.

In the step S1610, the printer profile of the network printer 50 is obtained or fetched by the server 40 from the profile storage unit 42 in the server 40, and the flow advances to a step S1611.

In the step S1611, the one-dimensional LUT data generated in the step S1609 is stored in the printer profile obtained in the step S1610, and the flow advances to a step S1612.

In the step S1612, the printer profile in which the one-dimensional LUT data has been additionally stored is stored in the calibration profile storage unit 43 in the server 40 as the calibration profile, and then the process terminates.

As above, it becomes possible to initiate the calibration profile in the server 40, generate the calibration data in the server 40, and add the generated data to the printer profile.

Further, in the above calibration process, since the calibration profile is stored independently of the original printer profile, the original printer profile is never changed. Therefore, even if the same-type printers are connected to the network, the color matching process can be well performed by one printer without any influence of calibration by the other printer.

Figure 30:
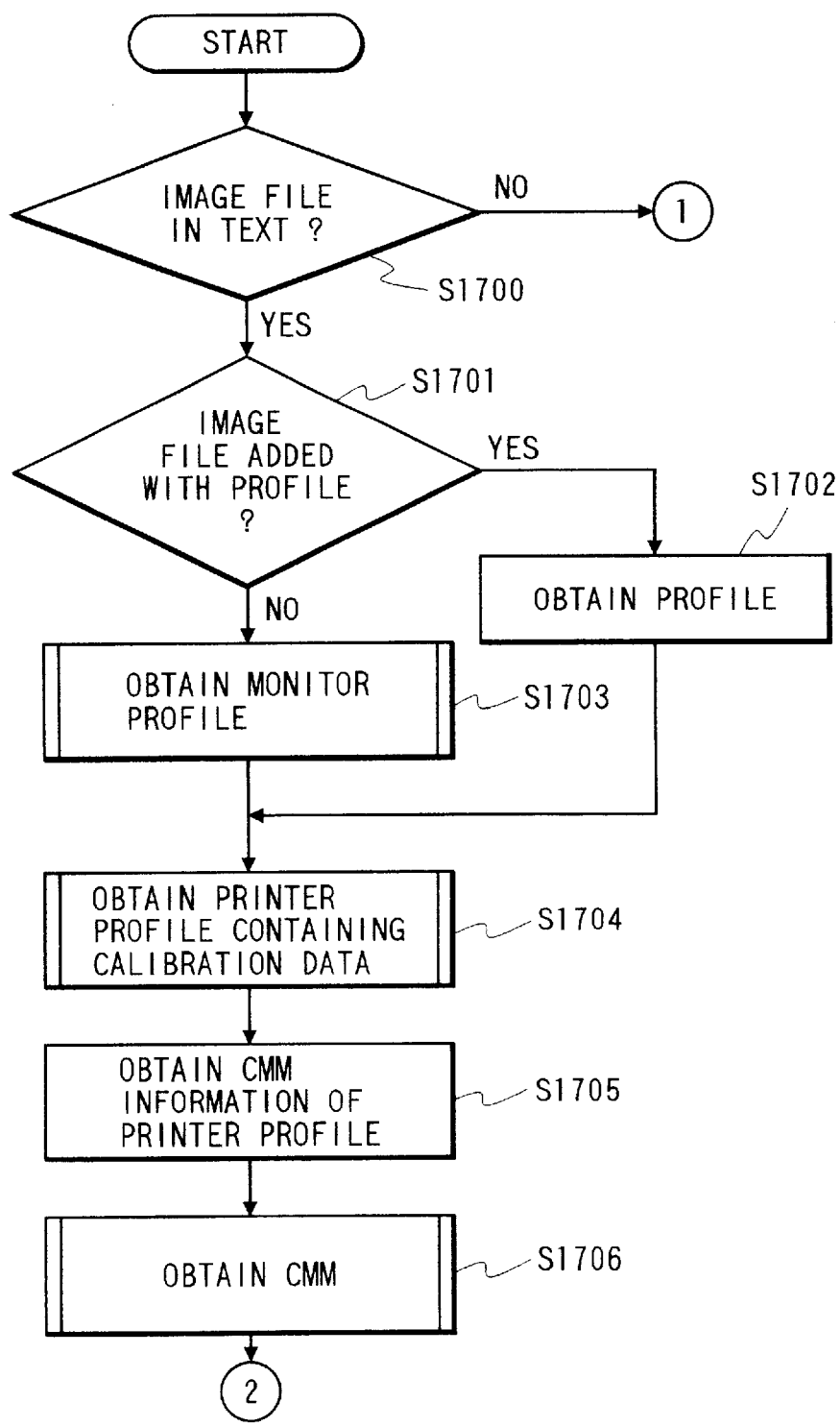
FIG. 30 is a flow chart showing a process wherein, in case of printing a text by using the network printer 50, a color matching process on data in the text is performed by the network server 40 by using the formed calibration profile and then the processed data is outputted to the network printer 50.
Figure 31:
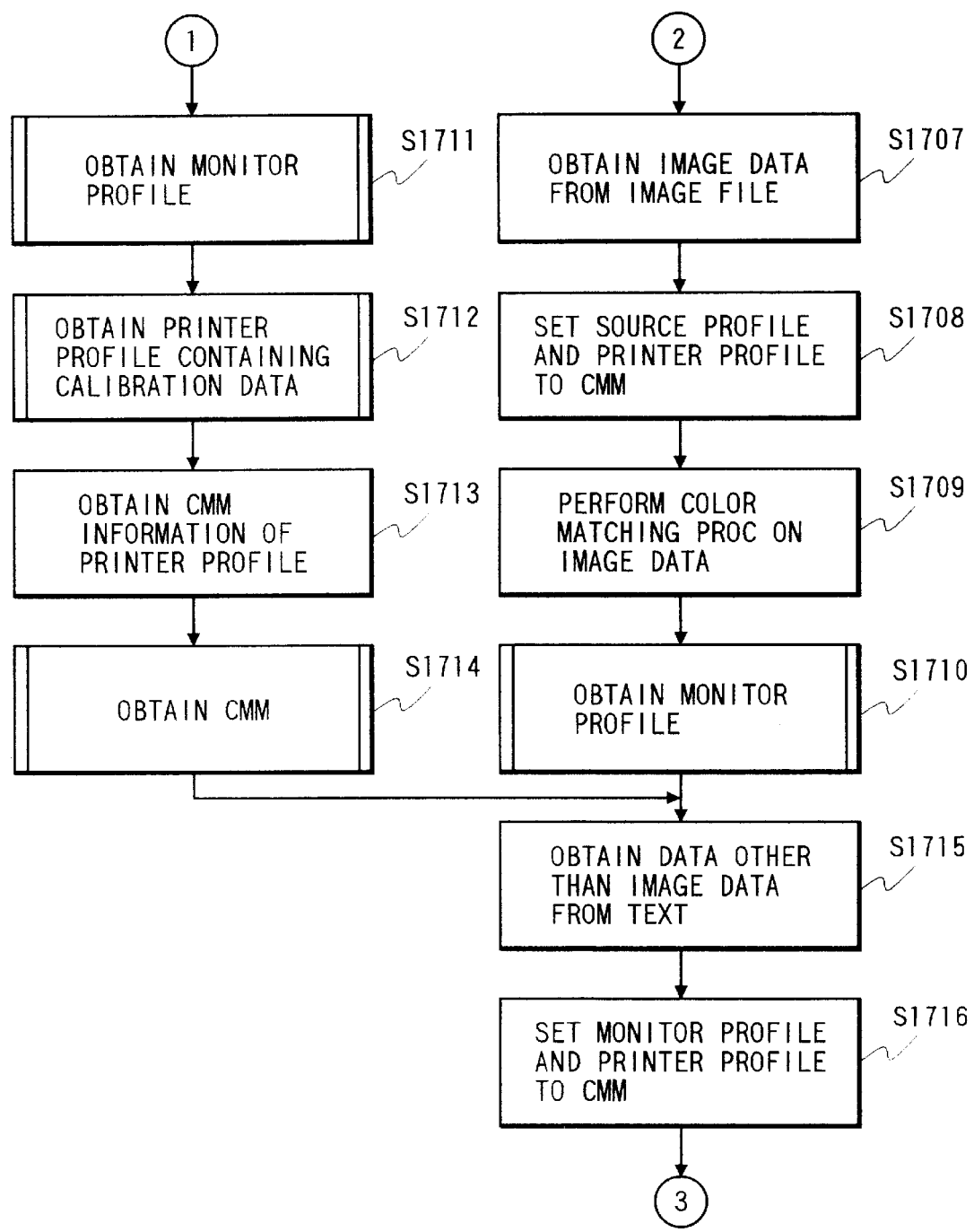
FIG. 31 is a flow chart showing the process wherein, in case of printing the text by using the network printer 50, the color matching process on the data in the text is performed by the network server 40 by using the formed calibration profile and then the processed data is outputted to the network printer 50.
Figure 32:
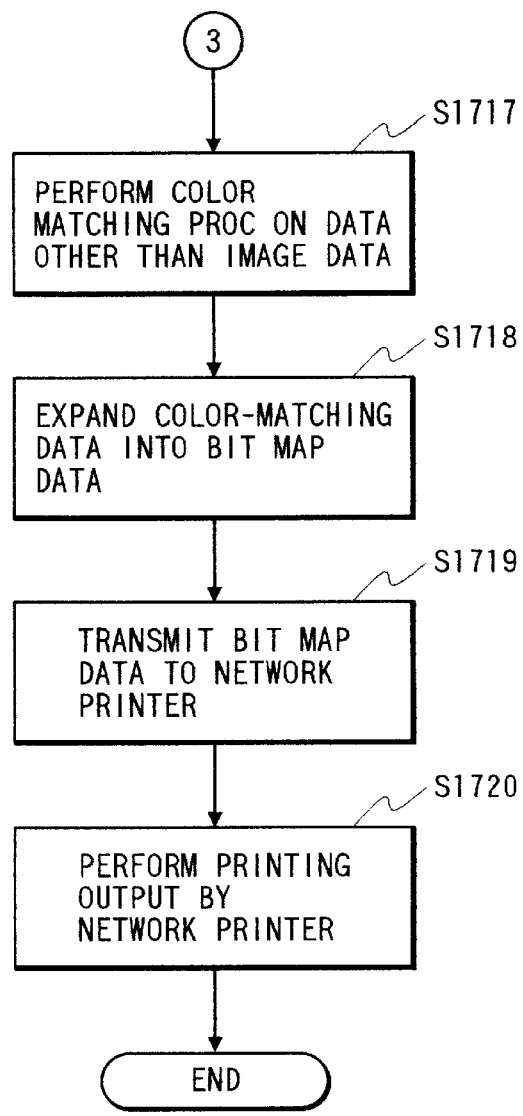
FIG. 32 is a flow chart showing the process wherein, in case of printing the text by using the network printer 50, the color matching process on the data in the text is performed by the network server 40 by using the formed calibration profile and then the processed data is outputted to the network printer 50.

FIGS. 30 to 32 are flow charts showing a process wherein, in case of printing the text by using the network printer 50, the color matching process on the data in the text is performed by the network server 40 with use of the calibration profile formed in FIGS. 28 and 29, and then the processed data is outputted to the network printer 50.

In a step S1700, it is checked whether or not the image file exists in the text to be printed.

If the image file does not exist, it can be considered that all the data in the text were generated or formed on the monitor. Therefore, the color matching process between the monitor of the network terminal 10 and the network printer 50 is performed.

In a step S1711, the monitor profile of the monitor in the network terminal 10 is obtained in the network server 40, and the flow advances to a step S1712.

In the step S1712, the printer profile in which the calibration data of the network printer 50 has been stored is obtained from the calibration profile storage unit 43 to the network server 40, and the flow advances to a step S1713.

In the step S1713, the CMM information of the header portion of the downloaded printer profile is obtained, and the flow advances to a step S1714.

In the step S1714, the CMM coincident with the CMM information obtained in the step S1713 is obtained in the network server 40, and the flow advances to a step S1715.

If the image file exists in the step S1700, the flow advances to a step S1701 to check whether or not the profile is added to the above image file.

If the profile is added, the flow advances to a step S1702 to obtain the device profile, and then the flow advances to a step S1704.

Such the profile is the profile for the scanner, the monitor or the like, and thus managed as the source profile.

If the profile is not added in the step S1701, the flow advances to a step S1703 to obtain the monitor profile of the monitor in the network terminal 10 by the network server 40, and then the flow advances to the step S1704.

In the step S1704, the printer profile of the network printer 50 in which the calibration data has been stored is obtained from the calibration profile storage unit 43 by the server 40, and the flow advances to a step S1705.

In the step S1705, the CMM information of the header portion of the obtained printer profile is obtained, and the flow advances to a step S1706.

In the step S1706, the CMM coincident with the CMM information obtained in the step S1705 is obtained from the CMM storage unit 41 by the server 40, and the flow advances to a step S1707.

In the step S1707, the image data is obtained from the image file in the text, and the flow advances to a step S1708.

In the step S1708, the source profile obtained in the step S1702 or S1703 and the printer profile obtained in the step S1704 are set to the CMM, and the flow advances to a step S1709.

In the step S1709, the color matching process on the image data obtained in the step S1707 is performed on the side of the server 40 by using the CMM in the step S1708.

By such the process up to this time, as can be understood, it becomes possible to obtain the necessary source profile, the printer profile in which the calibration data has been stored, and the CMM, by the network server, and further perform the color matching process on the image data in the text on the side of the network server 40.

Further, in a step S1710, the monitor profile of the monitor in the network terminal 1 is obtained by the network server 40, and the flow advances to the step S1715.

In the step S1715, the data (character, graphics or the like) other than the image in the text is obtained, and the flow advances to a step S1716.

In the step S1716, the monitor profile (i.e., source profile) downloaded in the step S1710 or S1711 and the printer profile obtained by the server 40 in the step S1704 or S1712 are set to the CMM, and the flow advances to a step S1717.

In the step S1717, the color matching process on the data other than the image obtained in the step S1715 is performed by using the CMM in the step S1716, and the flow advances to a step S1718.

By such the process up to this time, as can be understood, it becomes possible to obtain the necessary source profile, the printer profile containing the calibration data and the CMM by the server 40, and perform the color matching process on the data other than the image in the text on the side of the server 40.

In the step S1718, the data subjected to the color matching in the steps S1709 and S1717 are expanded into the bit map data in the server 40 such that the expanded data can be outputted by the network printer 50, and the flow advances to a step S1719.

In the step S1719, the bit map data expanded in the step S1718 is transmitted from the network server 40 to the network printer 50 through the network 30, and the flow advances to a step S1720.

In the step S1720, the bit map data transmitted in the step S1719 is received and printed by the network printer 50, and then the process terminates.

By such the process, it becomes possible to obtain the necessary source profile, the printer profile containing the calibration data and the CMM by the network server 40, perform the color matching process (including calibration process) on the image data in the text and the data other than the image on the side of the network server 40 and print the processed data by the network printer 50.

Figure 33:
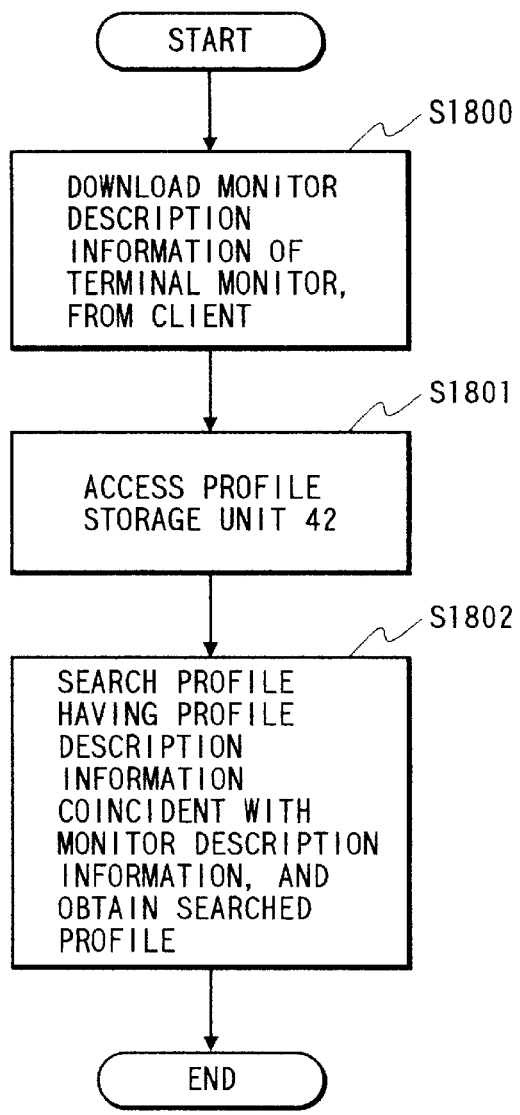
FIG. 33 is a flow chart showing a detailed process in a case where a monitor profile of a monitor of a network terminal 10 is obtained by the network server 40.

FIG. 33 is a flow chart showing in detail the processes in the steps S1703, S1710 and S1711 wherein the monitor profile of the monitor of the network terminal 10 is obtained in the network server 4.

In a step S1800, the monitor description information of the monitor of the network terminal 10 stored in the monitor description information storage unit 11 is downloaded from the network terminal 10, and the flow advances to a step S1801.

In the step S1801, the profile storage unit 42 of the network server 40 is accessed, and the flow advances to a step S1802.

In the step S1802, the profile which has the profile description information coincident with the monitor description information is searched and obtained, and then the process terminates.

As above, the monitor profile of the monitor of the network terminal 10 can be obtained in the network server 40.

FIG. 34 is a flow chart showing in detail the processes in the steps S1704 and S1712 wherein the printer profile of the network printer 50 in which the calibration data has been stored is obtained in the network server 40.

In a step S1900, the printer description information of the network printer 50 is downloaded from the printer description information storage unit 12 of the network terminal 10, and the flow advances to a step S1901.

In the step S1901, the calibration profile storage unit 43 of the network server 40 is accessed, and the flow advances to a step S1902.

In the step S1902, the printer profile which has the profile description information coincident with the printer description information and in which the calibration data has been stored is obtained, and then the process terminates.

As above, the printer profile of the network printer 50 in which the calibration data has been stored can be obtained in the network server 40.

FIG. 35 is a flow chart showing in detail the process in the step S1706 or S1714 wherein the CMM used in the color matching process is obtained in the network server 40.

In a step S1910, the CMM storage unit 41 of the network server 40 is accessed, and the flow advances to a step S1920.

In the step S1920, it is searched the CMM which has the CMM registration information coincident with the CMM information of the printer profile in which the calibration data has been stored, and then the process terminates.

As above, the CMM used in the color matching process can be obtained in the network server 40.

Third Embodiment

In the third embodiment, it will be explained a method for calibrating a device profile stored in a server which method is different from that in the second embodiment.

Figure 36:
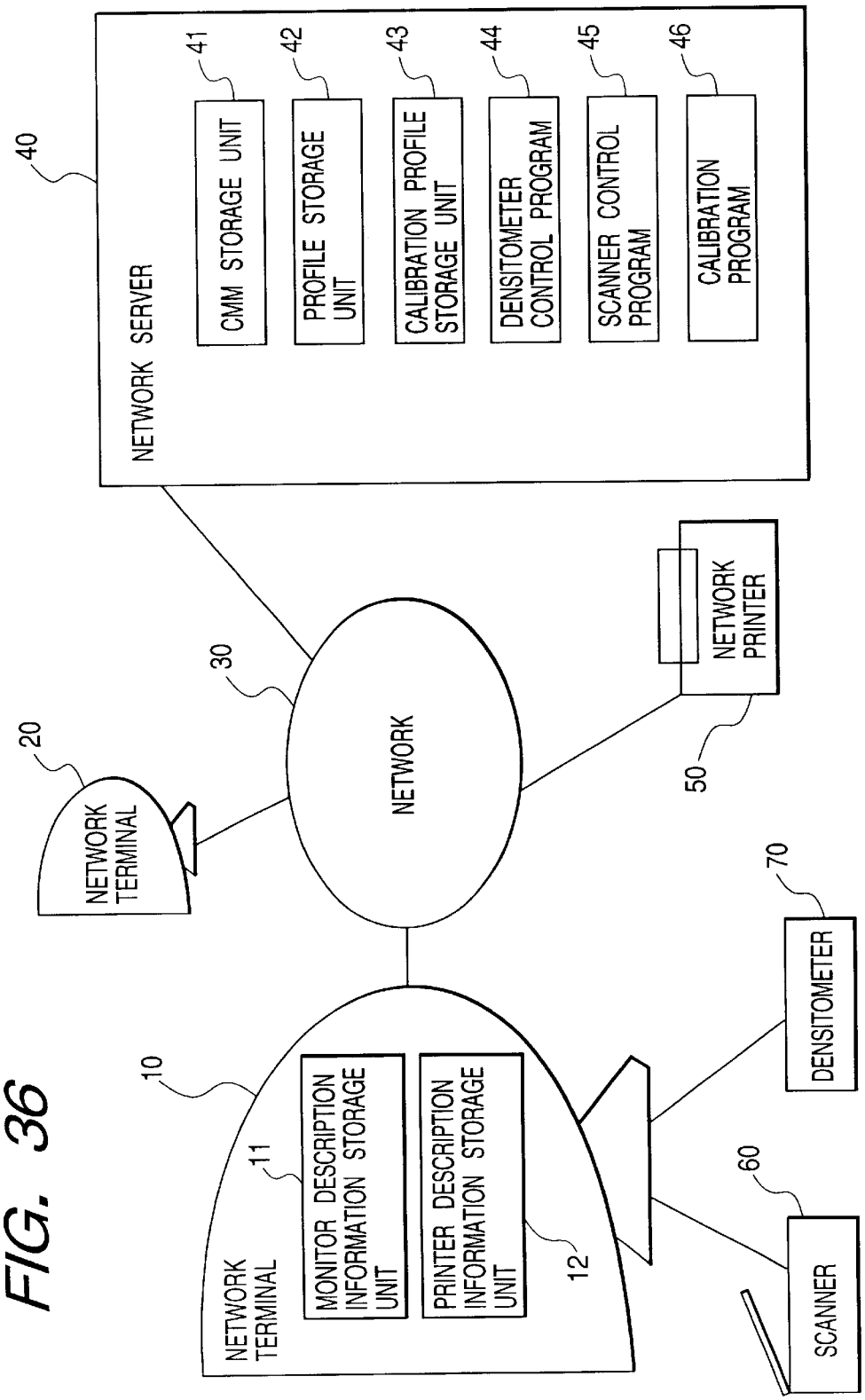
FIG. 36 is a view showing structure of a network system according to a third embodiment.

FIG. 36 is a view showing structure of a network system according to the third embodiment. In FIG. 36, it should be noted that the same components as those in FIG. 27 are added with the same reference numerals, respectively.

As shown in FIG. 36, the network system according to the present embodiment is composed of network terminals 10 and 20, a network server 40, a network printer 50, a scanner 60, a densitometer 70, and a network 30 to which the network terminals 10 and 20, the network server 40 and the network printer 50 are connected.

The network terminal 10 has a CPU, a VRAM and the like necessary for monitor displaying and image processing, and a communication function necessary for the communication in the network. Further, the network terminal 10 has a monitor description information storage unit 11 for storing monitor description information to discriminate a monitor and a printer description information storage unit 12 for storing printer description information to discriminate the network printer 50.

The network server 40 has a CPU, a RAM, a hard disk and the like necessary for image processing and printing processing, and a communication function necessary for the communication in the network. Further, the network server 40 has a CMM storage unit 41 in which n (n is constant) CMMs have been registered, a profile storage unit 42 in which m (m is constant) device profiles (monitor, scanner and printer) have been stored, a calibration profile storage unit 43 in which the printer profile containing therein calibration data has been stored, a densitometer control program 44 which has a function for controlling the densitometer to measure density of color patch output and obtaining or capturing the measured data, a scanner control program 45 which has a function for controlling the scanner to read the color patch output and obtaining or capturing the read data, and a calibration program 46 which has a function for generating the calibration data based on the data obtained by the densitometer control program 44 and the scanner control program 45.

The scanner 60 and the densitometer 70 are connected to the network terminal 10. Each CMM registered or stored in the CMM storage unit 41 has registration information (e.g., four-byte English numerals: UCCM) for discrimination. FIG. 26 shows the user interface (dialog) which is used in case of causing a user to select calibration accuracy when the calibration program 46 is executed. In this case, if the user wishes to the accuracy higher than ordinary accuracy, he may select "high".

Figure 37:
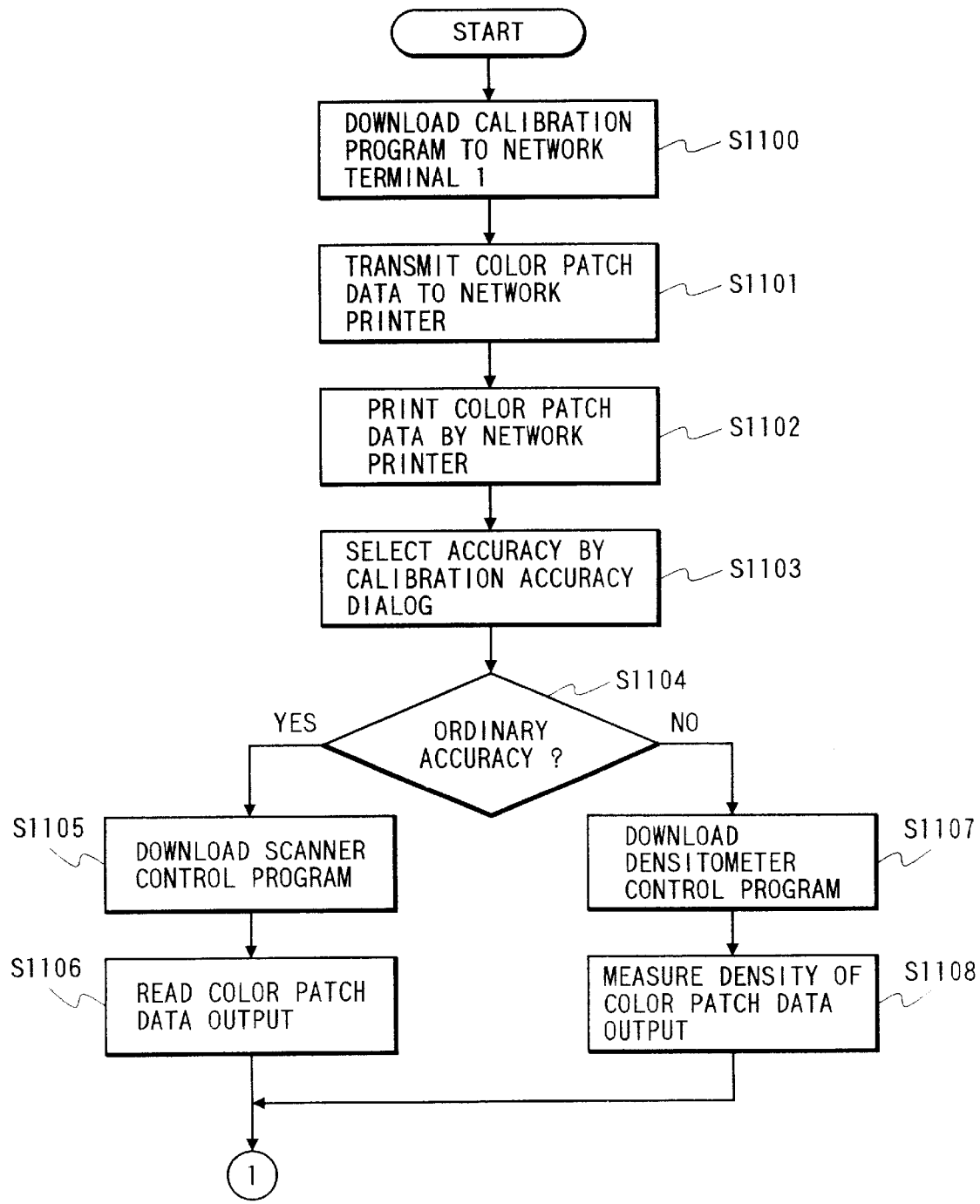
FIG. 37 is a flow chart showing a process wherein calibration data of a network printer 50 is generated by a network terminal 10 and then the generated data is stored in a printer profile to form and store a calibration profile.

FIGS. 37 and 38 are flow charts showing a process in the network terminal 10, wherein the calibration data of the network printer 50 is generated, a calibration profile is formed and stored by storing the generated calibration data into the printer profile.

In a step S1100, the calibration program 46 in the server 40 is downloaded to the network terminal 10, and the flow advances to a step S1101.

In the step S1101, color patch data for forming the calibration is transmitted from the network terminal 10 to the network printer 50, and the flow advances to a step S1102.

In the step S1102, the color patch data is printed by the network printer 50, and the flow advances to a step S1103.

In the step S1103, the calibration program 46 is initiated, the dialog for selecting the calibration accuracy in FIG. 26 is displayed, the user selects the accuracy, and then the flow advances to a step S1104.

In the step S1104, if the user selects the ordinary accuracy, the flow advances to a step S1105. In the step S1105, the scanner control program 45 in the server 40 is downloaded to the network terminal 10, and the flow advances to a step S1106.

In the step S1106, the color patch data output printed in the step S1102 is read by the scanner 60, and the flow advances to a step S1109.

In the step S1104, if the user selects the high accuracy, the flow advances to a step S1107 to download the densitometer control program 44 from the server 40 to the network terminal 10. Then, the flow advances to a step S1108.

In the step S1108, the color patch data output printed in the step S1102 is read by the densitometer 70, and the flow advances to the step S1109.

In the step S1109, based on the data obtained in the step S1106 or S1108, the one-dimensional LUT data shown in FIG. 22 is generated according to the calibration program 46, and the flow advances to a step S1110.

In the step S1110, the printer profile of the network printer 50 is downloaded from the profile storage unit 42 in the server 40 to the network terminal 10, and the flow advances to a step S1111.

In the step S1111, the one-dimensional LUT data generated in the step S1109 is stored in the printer profile, and the flow advances to a step S1112.

In the step S1112, the printer profile in which the one-dimensional LUT data has been additionally stored is transmitted to the server 40, and the flow advances to a step S1113.

In the step S1113, the transmitted printer profile is stored in the calibration profile storage unit 43 of the server 40 as the calibration profile, and then the process terminates.

As above, it becomes possible to download the necessary program and the like from the server, generate the calibration data in the network terminal 10, and add the generated data to the printer profile.

Fourth Embodiment

In the fourth embodiment, as a modification of the above-described embodiments, it will be explained a network system having the two calibration methods respectively described in the second and third embodiments.

In the present embodiment, the network system in which the structure of the network systems shown in FIGS. 27 and 36 are combined is assumed. That is, the network terminal shown in FIG. 36 to which the scanner and the densitometer are connected, and the network terminal shown in FIG. 27 to which any input device is not connected are connected to a network. As shown in FIG. 27, the scanner and the densitometer are connected to the server 40.

In the present embodiment, a user can select the calibration method shown in FIGS. 28 and 29 or the calibration method shown in FIGS. 37 and 38, according to a situation.

As shown in the step S1600 of FIG. 28, if the server is demanded from the network terminal to initiate the calibration program, the server executes the calibration method shown in FIGS. 28 and 29.

On the other hand, as shown in the step S1100 of FIG. 37, if the server is demanded from the network terminal to download the calibration program, the server executes the calibration method shown in FIGS. 37 and 38.

As in the present embodiment, by making the plural calibration methods selectable, the calibration process according to user's use can be executed.

In the present embodiment, since the devices (network terminal and server) for executing the calibration process are selectable, such the device is selected according to a situation of load of each device, whereby the process can be effectively performed.

Further, for example, in a case where the network terminal has its unique calibration program, it may be possible to download the desired device profile from the server and perform the calibration process in the network terminal by using such the unique calibration program. According to this calibration method, it becomes possible to perform the calibration of which accuracy is higher than that of the calibration method supported by the network server. Further, as a framework of the network system is utilized, the calibration process according to the user's use can be performed. That is, freedom of the calibration process for the user becomes high.

Other Embodiments

The invention employed by a method wherein program codes of a software to realize the functions of the above-described embodiments are supplied to a computer in an apparatus or a system connected to various devices so as to make the devices operative in order to realize the functions of the above-described embodiments and the various devices are operated in accordance with the programs stored in the computer (CPU or MPU) of the system or apparatus is also included in the scope of the present invention.

In such the case, the program codes themselves of the software realize the functions of the above-described embodiments and the program codes themselves and means for supplying the program codes to the computer, e.g., a storage medium in which the program codes have been stored, construct the present invention.

As such a memory medium to store the program codes, e.g., it is possible to use a floppy disk, a hard disk, an optical disk, a magneto-optical disk, a CD-ROM, a magnetic tape, a nonvolatile memory card, a ROM or the like can be used.

Also, even in not only a case where the functions of the above-described embodiments are realized by executing the supplied program codes by the computer but also a case where the functions of the above-described embodiment are realized in cooperation with the OS (operating system) by which the program codes operate in the computer or another application software or the like, such the program codes are of course included in the scope of the present invention.

Further, of course, the present invention also includes a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiment are realized by the processes.

The present invention has been described in connection with the above preferred embodiments. However, the present invention is not limited only to the above-described embodiment, but various modifications are possible without departing from the scope of the appended claims.

What is claimed is:

1. A network server for communicating with a network terminal through a network, comprising:

holding means for holding a plurality of different device profiles;

source profile setting means for setting a source profile;

reception means for receiving, from the network terminal, selection information of a destination profile;

destination profile setting means for selecting a device profile from the plurality of device profiles held in said holding means, based on the selection information, and setting the selected device profile as the destination profile;

color matching means for performing a color matching process on image data that includes one or more objects, by using a color management module, the source profile and the destination profile, wherein the color matching process is performed according to what kind of object each of the objects in the image data is; and communication means for outputting the image data that has been subjected to the color matching process, to an external apparatus through the network, wherein said source profile setting means receives a profile from the network terminal and sets the received profile as the source profile when the receiverd profile is attached to an image file, and receives profile selection information of the user from the network terminal and sets the profile corresponding to the profile selection information as the source profile when no profile is attached to the image file, and wherein said communication means outputs the image data that has been subjected to the color matching process to said network terminal when image data that has been subjected to the color matching process is displayed on a monitor, and outputs the image data that has been subjected to the color matching process to a network printer when image data that has been subjected to the color matching process is output by the printer.

2. A network server according to claim 1, further comprising calibration means for calibrating a device profile preparatory to storing that device profile in said holding means.

3. A network server according to claim 2, wherein said holding means includes first storage means for storing the plural device profiles and second storage means for storing the device profile calibrated by said calibration means.

4. A network server according to claim 2, further comprising selection means for selecting an arbitrary calibration method from among plural calibration methods, and wherein said calibration means calibrates the device profile by using the calibration method selected by said selecting means.

5. A network server according to claim 1, further comprising selection means for selecting the color management module based on the destination profile.

6. An image processing method used in a network server for communicating with a network terminal through a network, comprising the steps, performed by the server, of:

holding a plurality of different device profiles;

setting a source profile;

receiving, from the network terminal, selection information of a destination profile;

selecting a device profile from the plurality of device profiles held in said holding step, based on the selection information, and setting the selected device profile as the destination profile;

performing a color matching process on image data that includes one or more objects, by using a color management module, the source profile and the destination profile, wherein the color matching process is performed according to what kind of object each of the objects in the image data is; and outputting the image data that has been subjected to the color matching process, to an external apparatus through the network, wherein said selecting step includes receiving a profile from the network terminal and setting the received profile as the source profile when the received profile is attached to an image file, and receiving profile selection information of a user from the network terminal and setting the profile corresponding to the profile selection information as the source profile when no profile is attached to the image file, and wherein said outputting step includes outputting the image data that has been subjected to the color matching process to the network terminal when an image data that has been subjected to the color matching process is displayed on a monitor, and outputting the image data that has been subjected to the color matching process to a network printer when an image data that has been subjected to the color matching process is output by the printer.

7. A storage medium which stores a computer readable program for realizing an image processing method used in a network server for communicating with a network terminal through a network, said method comprising the steps, performed by the server, of:

holding a plurality of different device profiles;

setting a source profile;

receiving, from the network terminal, selection information of a destination profile;

selecting a device profile from the plurality of device profiles held in said holding step, based on the selection information, and setting the selected device profile as the destination profile;

performing a color matching process on image data that includes one or more objects, by using a color management module, the source profile and the destination profile, wherein the color matching process is performed according to what kind of object each of the objects in the image data is; and outputting the image data that has been subjected to the color matching process, to an external apparatus through the network, wherein said selecting step includes receiving a profile from the network terminal and setting the received profile as the source profile when the received profile is attached to an image file, and receiving profile selection information of a user from the network terminal and setting the profile corresponding to the profile selection information as the source profile when no profile is attached to the image file, and wherein said outputting step includes outputting the image data that has been subjected to the color matching process to the network terminal when an image data that has been subjected to the color matching process is displayed on a monitor, and outputting the image data that has been subjected to the color matching process to a network printer when an image data that has been subjected to the color matching process is output by the printer.

* * * * *

UNITED STATES PATENT AND TRADEMARK OFFICE
CERTIFICATE OF CORRECTION

PATENT NO.     : 6,829,058 B1
DATED          : December 7, 2004
INVENTOR(S)    : Shuichi Kumada It is certified that error appears in the above-identified patent and that said Letters Patent is hereby corrected as shown below:

Column 1,
Line 22, "called" should read -- referred to --.
Line 23, "'called" should read -- referred to --.
Line 50, "been" should read -- have been --.

Column 2,
Line 4, "obtained the" should read -- the obtained --.
Line 8, "An another" should read -- Another --.

Column 3,
Line 40, "an-example" should read -- an example --.

Column 5,
Line 23, "can not" should read -- cannot --.

Column 6,
Line 59, "checked" should read -- checked in --.
Line 66, "can not" should read -- cannot --.

Column 10,
Line 49, "weather" should read -- whether --.

Column 11,
Line 12, "it is instructed" should be deleted.
Line 13, "server 3" should read -- server 3 is instructed --.
Line 46, "FIG." should read -- ¶ FIG. --.

Column 12,
Line 13, "it" should read -- there --.

Column 16,
Line 39, "it is searched the" should read -- there is searched a --.

Column 17,
Line 26, "FIG." should read -- ¶ FIG. --.

UNITED STATES PATENT AND TRADEMARK OFFICE
CERTIFICATE OF CORRECTION

PATENT NO. : 6,829,058 B1
DATED : December 7, 2004
INVENTOR(S) : Shuichi Kumada

It is certified that error appears in the above-identified patent and that said Letters Patent is hereby corrected as shown below:

<u>Column 20,</u>
Line 3, "receiverd" should read -- received --.
Line 31, "selecting" should read -- selection --.

Signed and Sealed this

Thirteenth Day of June, 2006

JON W. DUDAS
*Director of the United States Patent and Trademark Office*